US009939177B2

(12) United States Patent
Hines et al.

(10) Patent No.: US 9,939,177 B2
(45) Date of Patent: Apr. 10, 2018

(54) OPTICAL PROXY FOR SENSING AND POINTING OF LIGHT SOURCES

(75) Inventors: Braden E. Hines, Pasadena, CA (US); Richard L. Johnson, Suffolk, VA (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 837 days.

(21) Appl. No.: 14/004,983

(22) PCT Filed: Mar. 14, 2012

(86) PCT No.: PCT/US2012/029106
§ 371 (c)(1),
(2), (4) Date: Jan. 2, 2014

(87) PCT Pub. No.: WO2012/125748
PCT Pub. Date: Sep. 20, 2012

(65) Prior Publication Data
US 2016/0195302 A1    Jul. 7, 2016

Related U.S. Application Data

(60) Provisional application No. 61/465,165, filed on Mar. 14, 2011, provisional application No. 61/562,962, filed on Nov. 22, 2011.

(51) Int. Cl.
*F24J 2/38* (2014.01)
*F24J 2/07* (2006.01)
(Continued)

(52) U.S. Cl.
CPC . *F24J 2/38* (2013.01); *F24J 2/07* (2013.01); *F24J 2/08* (2013.01); *F24J 2/16* (2013.01);
(Continued)

(58) Field of Classification Search
CPC ......................................... F24J 2/38; F24J 2/07
(Continued)

(56) References Cited

U.S. PATENT DOCUMENTS

| 4,349,733 A * | 9/1982 | Beam .................... G01S 3/7861 |
| | | 126/577 |
| 4,519,382 A | 5/1985 | Gerwin |

(Continued)

FOREIGN PATENT DOCUMENTS

| CN | 1353819 | 6/2002 |
| CN | 1515917 | 7/2004 |

(Continued)

OTHER PUBLICATIONS

European Patent Application No. 13741310.0; Extended Search Report dated Oct. 26, 2015.
(Continued)

*Primary Examiner* — Avinash Savani
*Assistant Examiner* — Aaron Heyamoto
(74) *Attorney, Agent, or Firm* — Kagan Binder, PLLC

(57) ABSTRACT

The present invention relates to apparatus and methods to provide a control system for the purpose of redirecting light from a source onto a target. The present invention appreciates that the optical properties of light that is both modified and/or distributed, e.g. by diffraction, diffusion, or some other process, and also redirected by a heliostat, can be a function of how the light redirecting element is aimed. This means that the aim of the light redirecting element can be precisely determined once the aim of the modified and/or distributed light is known. Advantageously, the characteristics of modified and/or distributed light indicative of how that light is aimed can be determined from locations outside the zone of concentrated illumination in which sensors are at undue risk. This, in turn, means that modified and/or dis-
(Continued)

tributed light characteristics can be detected at a safe location, and this information can then be used to help precisely aim the light redirecting element onto the desired target, such as a receiver in a CSP system. The aim of the modified and/or distributed light is thus an accurate proxy for the light beam to be aimed at the receiver.

21 Claims, 27 Drawing Sheets

(51) Int. Cl.
| | |
|---|---|
| F24J 2/08 | (2006.01) |
| F24J 2/16 | (2006.01) |
| F24J 2/40 | (2006.01) |
| F24J 2/54 | (2006.01) |
| G02B 5/02 | (2006.01) |
| G02B 19/00 | (2006.01) |
| G02B 27/42 | (2006.01) |

(52) U.S. Cl.
CPC ............. *F24J 2/407* (2013.01); *F24J 2/5424* (2013.01); *G02B 5/02* (2013.01); *G02B 19/0019* (2013.01); *G02B 19/0042* (2013.01); *G02B 27/4255* (2013.01); *F24J 2002/385* (2013.01); *Y02E 10/41* (2013.01); *Y02E 10/47* (2013.01)

(58) Field of Classification Search
USPC .................................................. 126/573, 600
See application file for complete search history.

(56) References Cited

U.S. PATENT DOCUMENTS

| | | | |
|---|---|---|---|
| 4,874,937 | A | 10/1989 | Okamoto |
| 4,998,823 | A | 3/1991 | Kitajima |
| 5,282,016 | A | 1/1994 | Shen et al. |
| 5,670,774 | A | 9/1997 | Hill |
| 5,862,799 | A | 1/1999 | Yogev et al. |
| 6,174,648 | B1 | 1/2001 | Terao et al. |
| 6,923,174 | B1 | 8/2005 | Kurz |
| 9,010,317 | B1 | 4/2015 | Gross |
| 9,157,656 | B2 | 10/2015 | Saeck et al. |
| 9,606,340 | B2 | 3/2017 | Hines et al. |
| 2004/0131483 | A1 | 2/2004 | Kinoshita |
| 2005/0274376 | A1 | 12/2005 | Litwin et al. |
| 2006/0098566 | A1 | 5/2006 | Christian et al. |
| 2006/0163446 | A1 | 7/2006 | Guyer et al. |
| 2006/0201498 | A1 | 9/2006 | Olsson et al. |
| 2006/0260605 | A1 | 11/2006 | Connor |
| 2007/0268585 | A1* | 11/2007 | Santoro ............... F21S 11/00 359/599 |
| 2009/0052910 | A1 | 2/2009 | Schemmann et al. |
| 2009/0107485 | A1 | 4/2009 | Reznik et al. |
| 2009/0179139 | A1* | 7/2009 | Hines ................... F24J 2/10 250/203.4 |
| 2009/0249787 | A1 | 10/2009 | Pfahl et al. |
| 2010/0000517 | A1* | 1/2010 | Zalusky ............... F24J 2/38 126/600 |
| 2010/0139644 | A1 | 6/2010 | Schwarzbach et al. |
| 2010/0252024 | A1 | 10/2010 | Convery |
| 2010/0263709 | A1 | 10/2010 | Norman et al. |
| 2011/0000478 | A1 | 1/2011 | Reznik |
| 2011/0120448 | A1 | 5/2011 | Fitch et al. |
| 2011/0155119 | A1 | 6/2011 | Hickerson et al. |
| 2011/0216535 | A1 | 9/2011 | McEntee |
| 2011/0216578 | A1 | 9/2011 | McEntee |
| 2011/0238218 | A1 | 9/2011 | Lee et al. |
| 2011/0265783 | A1 | 11/2011 | Yatir |
| 2011/0317876 | A1 | 12/2011 | Bender |
| 2012/0132194 | A1 | 5/2012 | Saeck et al. |
| 2012/0145143 | A1 | 6/2012 | Hoffschmidt et al. |
| 2012/0174909 | A1 | 7/2012 | Koningstein et al. |
| 2014/0110560 | A1 | 4/2014 | Hines et al. |
| 2015/0160345 | A1 | 6/2015 | Hines et al. |

FOREIGN PATENT DOCUMENTS

| | | |
|---|---|---|
| CN | 101918769 A | 12/2010 |
| DE | 10 2009 037280 A1 | 4/2011 |
| WO | 2009/055624 A1 | 4/2009 |
| WO | 2010048589 A2 | 4/2010 |
| WO | 2010/101468 | 10/2010 |
| WO | 2011/018367 | 2/2011 |
| WO | WO 2011/018367 | 2/2011 |
| WO | WO 2011018367 A2 * | 2/2011 ............... F24J 2/07 |
| WO | 2012/125748 | 9/2012 |
| WO | 2012/125751 | 9/2012 |

OTHER PUBLICATIONS

Sargent & Lundy LLC Consulting Group, "Assessment of Parabolic Trough and Power Tower Solar Technology Cost and Performance Forecasts," Oct. 2003, 344 pages.

How it Works, Helistat, "Hands Down the Cheapest Way to Gather the Suns Energy," http://www.heliostat.us/howitworks.htm. pp. 1-3 (no date).

* cited by examiner

FIGURE 7A
FIGURE 7B
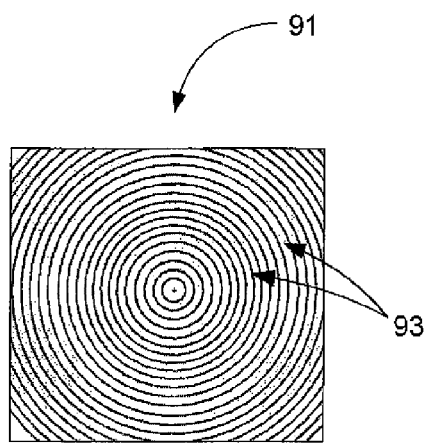
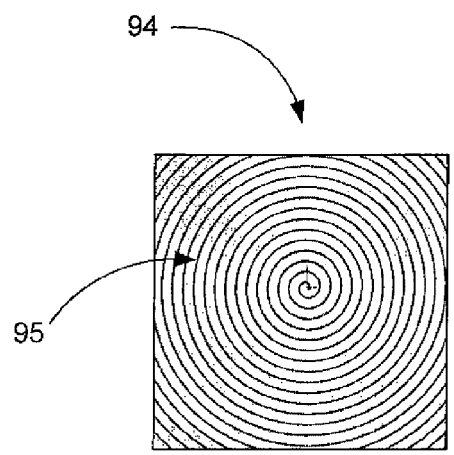
FIGURE 7C
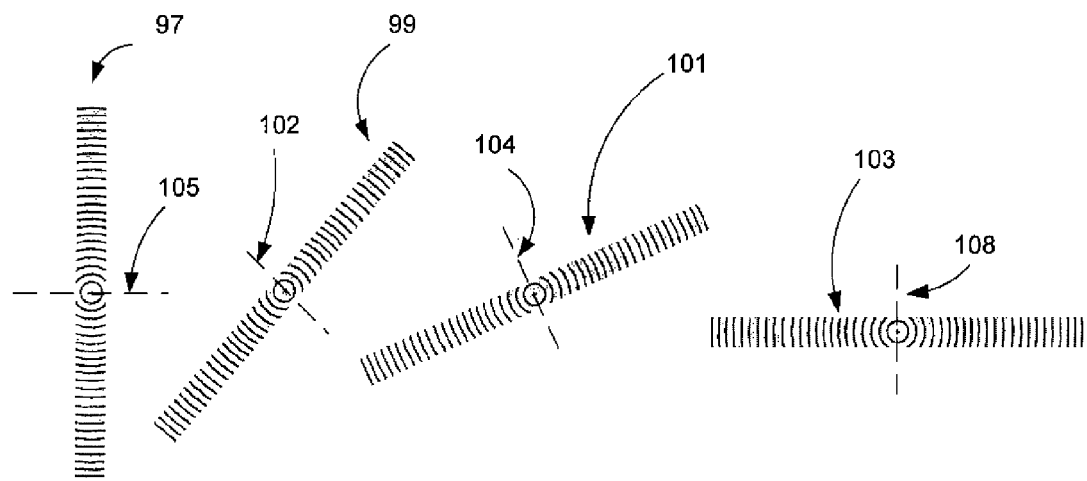

OPTICAL PROXY FOR SENSING AND POINTING OF LIGHT SOURCES

CROSS REFERENCE TO RELATED APPLICATION

This application claims the benefit from International No. PCT/US2012/029106, which was granted an International filing date of Mar. 14, 2012, which in turn claims the benefit of U.S. Provisional application No. 61/562,962 filed Nov. 22, 2011, titled OPTICAL PROXY FOR SENSING AND POINTING OF LIGHT SOURCES and U.S. Provisional application No. 61/465,165, filed Mar. 14, 2011, titled APPARATUS AND METHOD FOR POINTING LIGHT SOURCES, which applications are incorporated herein by reference in their entireties.

FIELD OF THE INVENTION

The present invention relates to control systems that use properties of light from a dispersed (i.e. distributed or broadcast) light beam to help aim light redirecting elements at desired target(s). More specifically, these strategies are used to controllably aim heliostats in the field of concentrating solar power (CSP).

BACKGROUND OF THE INVENTION

The use of heliostats in the field of concentrating solar power (CSP) is well established in the prior art. A typical CSP system includes at least one centralized tower and a plurality of heliostats corresponding to each centralized tower. The tower is centralized in the sense that the tower serves as the focal point onto which a corresponding plurality of heliostats collectively redirect and concentrate sunlight onto a target (also referred to as a focus or a receiver) associated with the tower. The concentration of sunlight at the tower receiver is therefore directly related to the number of heliostats associated with the tower up to certain fundamental limits. This approach concentrates solar energy to very high levels, e.g., on the order of 1000× or more if desired. In practical application, many systems concentrate sunlight in a range from 50× to 5000×. The high concentration of solar energy is converted by the tower into other useful forms of energy. One mode of practice converts the concentrated solar energy into heat to be used either directly or indirectly, such as by generating steam, to power electrical generators, industrial equipment, or the like. In other modes of practice, the concentrated solar energy is converted directly into electricity through the use of any number of photovoltaic devices, also referred to as solar cells.

Heliostats generally include a mirror or other suitable optical device to redirect sunlight, support structure to hold the mirror and to allow the mirror to be articulated, and actuators such as motors to effect the articulation. At a minimum, heliostats must provide two degrees of rotational freedom in order to redirect sunlight onto a fixed tower focus point. Heliostat mirrors may be planar, but could possibly have more complex shapes. Heliostat articulation can follow an azimuth/elevation scheme by which the mirror rotates about an axis perpendicular to the earth's surface for the azimuth and then rotates about an elevation axis that is parallel to the earth's surface. The elevation axis is coupled to the azimuth rotation such that the direction of the elevation is a function of the azimuth angle. Alternatively, heliostats can articulate using a tip/tilt scheme in which the mirror rotates about a fixed tip axis that is parallel to the earth's surface and a further tilt axis. The tip axis often is orthogonal to the tilt axis but its axis of rotation tips as a function of the tip axis rotation. The tilt axis is parallel to the earth's surface when the heliostat mirror normal vector is parallel to the normal vector of the earth's surface. Other schemes, such as polar tracking and many others, are also possible; the present invention is applicable to any of these schemes.

Heliostats are pointed so that the reflected sunlight impinges on the central tower receiver, which often is fixed in space relative to the heliostat. Because the sun moves relative to the heliostat site during the day, the heliostat reflectors must track the sun appropriately to keep the reflected light aimed at the receiver as the sun moves.

FIG. 1 schematically illustrates a typical CSP system 403. CSP system 403 has tower 405 with focus region 407 and a plurality of corresponding heliostats 409 (only one of which is shown for purposes of illustration) that aim reflected sunlight at region 407. Sunlight represented by vector 411 reflects off the heliostat mirror 413 oriented with surface normal represented by vector 415. Mirror 413 is accurately aimed so that reflected sunlight according to vector 417 is aimed at focus 407 generally along heliostat focus vector 419, which is the line of sight from the heliostat mirror 413 and the tower focus 407. If mirror 413 were to be aimed improperly so that vector 417 is not aimed at focus 407, these two vectors would diverge. Consequently, the reflected light 417 impinges on the tower focus 407. For such conditions to be realized, the laws of reflection require that the angle formed between the sunlight vector 411 and mirror normal 415 must be equal to the angle formed between vector 419 and mirror normal 415. Further, all three vectors 411, 415, and 419 must lie on the same plane. It can be shown using vector algebra that given a sunlight vector 411 and focus vector 419, there is a unique solution for mirror normal 415 that is simply the normalized average of vectors 411 and 419.

Many control strategies use open loop control, closed loop control, or combinations of these. Many heliostat control systems employ open loop algorithms based on system geometry and sun position calculators in order to determine the sun and heliostat-focus vectors as a function of time. These calculations result in azimuth/elevation or tip/tilt commands to each heliostat device. Such control systems generally assume that the locations of the heliostats are static and well defined and/or otherwise rely on periodic calibration maintenance to correct for settling and other lifetime induced drifts and offsets. Open loop solutions are advantageous in that they do not require any feedback sensors to detect how well each heliostat is pointed. These systems simply tell every heliostat how to point and assume that the heliostats point correctly. A major drawback is that open loop systems demand components made with high precision if accuracy is to be realized. Incorporating precision into the system components is very expensive. Additionally, it can be cost prohibitive to perform the precise surveying needed to perform open loop calculations with sufficient accuracy. The expense of precision and surveying escalates as the number of heliostats in a heliostat field increases. Consequently, systems that rely only on open loop control tend to be too expensive.

Closed loop heliostat control relies on feedback from one or more sensors capable of measuring differences, or errors, between the desired condition and an actual condition. These errors are then processed into compensation signals to heliostat actuators to articulate the mirrors so that reflected sunlight impinges on the tower focus. Closed loop pointing has an advantage that it does not require precise components or installation or knowledge of the system geometry. The system also can be made less sensitive to lifetime drifts. Less demand for precision means that these systems are much less expensive than systems that rely solely on open loop control. Closed loop systems offer the potential to use control software rather than predominantly precision, and control is much less expensive to implement than precision.

A difficulty in applying closed loop pointing methods on CSP systems results from the pointing condition requiring the bisection of two vectors rather than alignment to a single vector. That is, as show in FIG. 1, during normal operation, the heliostat mirror 413 itself doesn't point at anything in particular—rather, it must point in a direction 415 in between the sun 411 and the target 407, and the point moves with time as the sun moves. Nominally, there is nothing in that direction but empty sky, so there is nothing for a traditional closed loop tracking system to point the mirror at.

The ideal closed loop heliostat tracking system should sense the difference between the reflected sunlight vector 417 and the line of sight vector 419, and endeavor to control that difference to zero. Thus, CSP and concentrated photovoltaic (CPV) system designers have contemplated that an ideal location for a feedback sensor would be to place the sensor in the path of the reflected beam, such as at the tower focus 407. Unfortunately, this is not feasible because no practical sensor could withstand the extreme temperatures or the UV dosage that result from highly concentrated sunlight. This poses a significant technical challenge of how to track and correct the aim of a beam if the beam cannot be tracked.

Other schemes are possible, albeit less desirable. For example, one prior art system (http://www.heliostatus/howitworks.htm) discloses a sensor that controls sunlight vector 417 to be aligned with a third vector, the axis of a sensor near the heliostat. During installation of the system, the sensor is aligned with the line of sight vector 419. The accuracy of the system is thus dependent on the accuracy of this alignment, and on the alignment remaining unchanged. In large CSP systems, however, this may be insufficient for several reasons; for example, the tower 405 may sway in the wind or experience thermal expansion or contraction. Cost may also be an issue, since each heliostat requires a separate sensor.

A second type of "closed loop" heliostat system that is common in the prior art is a system that senses the orientation of the heliostat axes with respect to the heliostat base. That is, referring to FIG. 3, such a system may provide encoders that measure the rotations of axes 29 and 33. The control system then provides corrections to any detected errors in the orientation of these axes. This type of system mitigates errors in the gear train of the heliostat or errors, but it does not sense the sunlight vector 417 at all, so it is susceptible to any unseen errors in this vector, and it is blind to any errors in the alignment of sunlight vector 417 to line of sight 419. This system thus likewise may be sensitive to motions of the tower and long-term drifts. Practical systems tend to include elaborate calibration schemes to deal with these issues. Cost also is impacted, since encoders are needed for each axis of each heliostat.

Consequently, there remains a strong need for techniques that would allow closed loop pointing to be feasible.

SUMMARY OF THE INVENTION

The present invention relates to apparatus and methods to provide a closed loop pointing system for the purpose of redirecting light from a source onto a target. Whereas the principles of the invention disclosed herein are presented in the context of concentrating solar power, the apparatus and methods are generally applicable to any pointing system in which light is redirected onto one or more fixed and/or moving targets.

Embodiments in applicants' co-pending application 61/465,165 taught a diffractive element that is mechanically coupled to the light redirector. The present invention teaches that, in addition to diffractive optical elements, any optical element may be used that creates a signal that is an "optical proxy" for the redirected light beam. An optical proxy signal is one that has the following properties:

1. The optical proxy produces a light beam with properties that have a deterministic relationship to the redirected light beam. For example, as shown in FIG. 26, the rays 18 of the optical proxy beam have a deterministic relationship of intensity, wavelength, polarization, or other property as a function of its angular separation from the chief ray of the redirected main beam 17. Mathematically, if the angle from the redirected beam is $\phi$, then some property p of the proxy beam 18 should be a function $p(\phi)$. By way of illustration, the optical proxy beam shown in FIG. 26 is depicted as being a beam whose intensity decreases as the angular separation from the chief ray of the redirected main beam 17 increases. Optical proxy 23 preferably distributes light from the source throughout the angular space around chief ray 17.

2. The source of the light in the optical proxy beam is the same light source that is being redirected by the light redirector. For example, as shown in FIG. 26, the incoming sunlight is redirected by mirror 25 and is also distributed by the optical proxy 23.

3. The optical proxy distributes light broadly into three dimensions, into a broad cone proximal to the redirected light beam. That is, the intensity I of the distributed beam (note that the property p may be this intensity, but it may equally well be some other property) is such that the property p is detectable over a broad range of angles. The intensity is actually a function $I(\phi,\theta)$ of both the angular deviation $\phi$ and the rotation $\theta$ about the line of sight, and the optical proxy must provide a useful intensity for a broad range of angles $\phi$, at most values of $\theta$. Referring to FIG. 2A, when heliostat 9 is pointed in the right general direction (for example, in some embodiments, so that the reflected sunlight is within 45 degrees of the target 7) a large two-dimensional area proximal to target 7, including at least the area including imaging detectors 28, is illuminated by the broadcast light.

In many preferred embodiments, the light from the optical proxy beam is preferably substantially proximal in angle to the redirected light beam, helping to permit detectors of the optical proxy beam to be located near to one another and to the target for the redirected light, helping to minimize the cost of the proxy beam detection system.

In preferred embodiments, the function $p(\phi)$ varies, and the function $I(\phi,\theta)$ has substantially non-zero values, over a wide continuous range of angles $\phi$ and $\theta$, so that the optical proxy is functional over a continuous wide range of both angles.

In some embodiments, some property p may be a function of $\theta$ as well as $\phi$, thus providing additional information about the direction of the redirected main beam. In still further embodiments, the property p may be a function of just $\theta$. In yet further embodiments, optical proxies may be provided in combination, where some are functions of $\theta$ and some are functions of $\phi$, or any useful combination thereof.

Embodiments in applicant's co-pending application 61/465,165 taught a diffractive element that is mechanically coupled to the light redirector. The present invention teaches that an optical proxy of any sort may be mechanically coupled to the light redirector. It also teaches that the optical proxy may be integral to the light redirector; for example the optical proxy could be inscribed or embossed on the front or back surface of a mirror, or into the mirror's reflective coating prior to its attachment to the mirror's optical substrate.

In a related embodiment, the optical proxy may be a distinct element, but nonetheless integrally encapsulated within the light redirector, advantageously protecting it from the elements, for example. In one such embodiment wherein the light redirector is a mirror, the optical proxy is attached to the back side of the mirror substrate prior to the mirror coating being applied, thereby encapsulating the optical proxy between the mirror substrate and the mirror coating.

In some embodiments, the optical proxy is relatively small compared to the light redirector and is positioned substantially within the aperture of the light redirector. In other embodiments, the optical proxy may be offset from the aperture of the light redirector. For reasons of maximizing throughput, these embodiments tend to be preferable when used with optical proxies that redirect substantially all the light that strikes them into the proxy beam, such as some optical diffusers. Other types of proxies, including but not limited to a diffraction grating that is intentionally engineered for low efficiency, only direct a small amount of light into the proxy beam.

In some embodiments, an optical proxy, preferably of relatively low efficiency, such as 20% efficient or less, may fill a significant portion or substantially all of the light redirector's aperture, advantageously making the optical proxy physically large and thus easier to image with the central imaging subsystem.

Further embodiments of the present invention provide optical proxies that cover substantially all of the surface of the light redirecting element. This advantageously reduces the resolution of the imaging system required to detect the signal from the optical proxy. In such embodiments, the efficiency of the optical proxy is preferably very low, for example 1% or lower efficiency, so that most of the light is still redirected by the light redirecting element.

In such embodiments, the optical proxy is often preferably a transmissive optical element, so that light is able to pass through the optical proxy to reach the light redirecting element. In some embodiments, however, the optical proxy may be a reflective element. In this case, the optical proxy subsumes the optical functions of the light redirecting element. In some such embodiments, the optical proxy is a thin reflective film applied to the underlying glass substrate of the light redirecting element.

The present invention teaches that a particularly useful optical proxy is an optical diffuser, such as a ground glass diffuser. A diffuser of this sort distributes proxy light in a nominally Gaussian profile around the chief ray from the light redirector.

The invention further teaches that another useful optical proxy is a composite element comprising a plurality of individual optical elements. It also teaches that multiple properties of light may be used together to achieve additional utility; for example, both the intensity and wavelength of light may be used.

In one aspect, the present invention relates to a method of concentrating sunlight, comprising the steps of:
a) redirecting the sunlight;
b) using an optical proxy to optically modify and/or distribute a portion of the sunlight
c) observing the optically modified sunlight; and
d) using the observed, optically modified sunlight to controllably actuate a plurality of light redirecting elements in a manner that concentrates the redirected sunlight onto at least one target.

In another aspect, the present invention relates to a method of aiming re-directed sunlight, comprising the steps of providing an optical proxy that optically modifies and/or distributes sunlight in a manner corresponding to an aim of a light redirecting element, observing the optical proxy to determine optical information produced by the optical proxy; and using the optical information to aim the redirected sunlight onto a target.

In another aspect, the present invention relates to a system for concentrating sunlight onto a centralized target, comprising:
a) a plurality of heliostats, each heliostat comprising:
  i. a redirecting element that redirects incident sunlight;
  ii. an optical proxy that optically modifies incident sunlight;
b) a device that observes the optical element; and
c) a control system that uses an observed optical characteristic of the optical proxy to determine a compensation that articulates the redirecting elements to concentrate the redirected sunlight onto the centralized target.

In another aspect, the present invention relates to a heliostat that redirects sunlight, comprising:
a) a redirecting element that redirects incident sunlight; and
b) an optical proxy that optically modifies a portion of the sunlight incident on the heliostat, said optical proxy coupled to the redirecting element such that a characteristic of the optically modified sunlight is indicative of the orientation of sunlight redirected by the redirecting element.

In another aspect, the present invention relates to a heliostat system for concentrating sunlight onto a target, comprising:
a) a plurality of heliostats that redirect, optically modify, and concentrate sunlight onto the first centralized target; each heliostat comprising:
  i. a redirecting element that redirects incident light onto the centralized target; and
  ii. at least one optical proxy provided on the redirecting element;
b) an imaging device comprising a field of view that observes the optical proxy; and
c) a control system that uses a characteristic of the observed optical proxy to determine a compensation that articulates the redirecting elements to concentrate the redirected sunlight onto the centralized target.

In another aspect, the present invention relates to a closed loop pointing system that controls the pointing of a plurality of heliostats to concentrate light onto a centralized target, comprising:
a) a plurality of heliostats that optically modify and redirect sunlight that is incident on the heliostats; and
b) a control system that uses optically modified sunlight to control the articulation of the heliostats so that the redirected sunlight is concentrated onto the centralized target.

In another aspect, the present invention relates to a tracking control system including:

a) a plurality of optical proxies coupled to a plurality of light redirecting elements, wherein the light redirecting elements are mechanically coupled to a plurality of articulation devices
b) an imaging subsystem including at least one imaging device, said system having a field of view that encompasses the optical proxies;
c) a computational subsystem including a plurality of computational devices electrically coupled to the imaging subsystem and articulation devices; and
wherein observations of the optical proxies by the imaging subsystem are processed by the computational subsystem in order to effect articulation of the light redirection elements using the articulation devices.

In another aspect, the present invention relates to a solar tracking control system that controls the difference between the reflected sunlight vector and the line of sight vector by a method that comprises using an optical proxy coupled to a light redirecting element that provides optical information corresponding to the aim of the reflected sunlight vector.

BRIEF DISCRIPTION OF THE DRAWINGS

Figure 5:
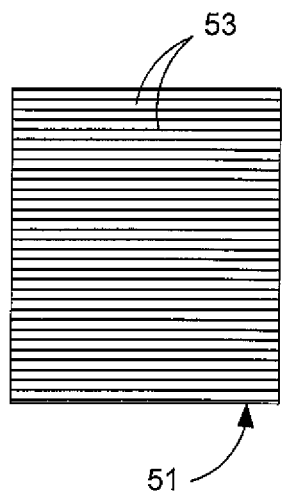
Figure 6A:
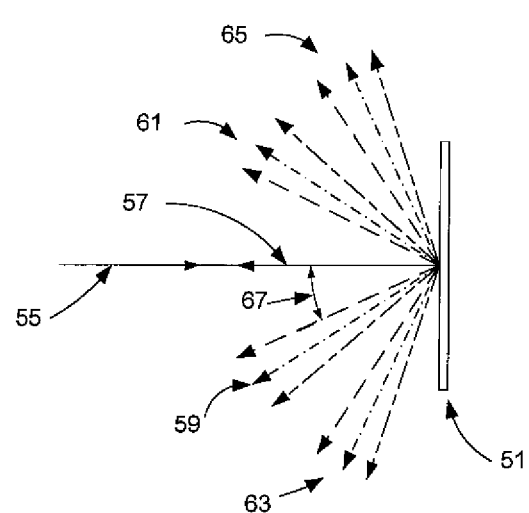
Figure 6B:
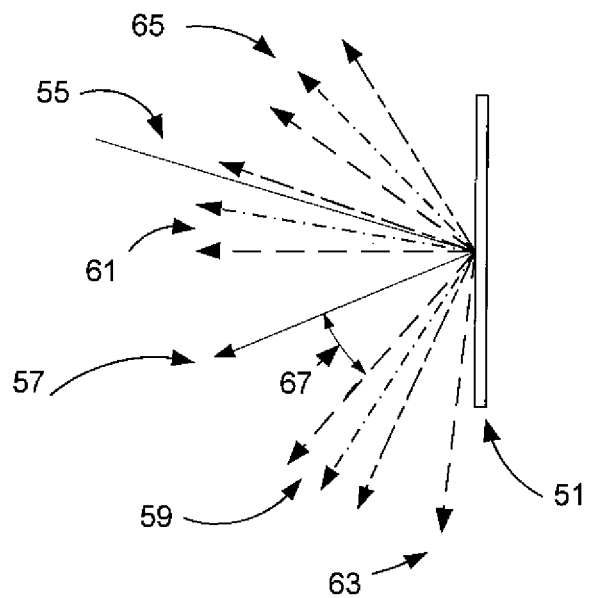
Figure 8A:
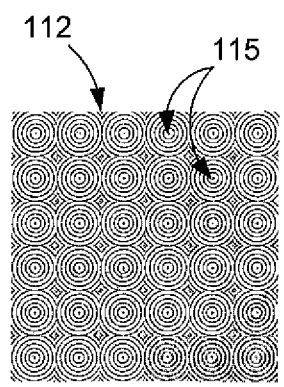
Figure 8B:
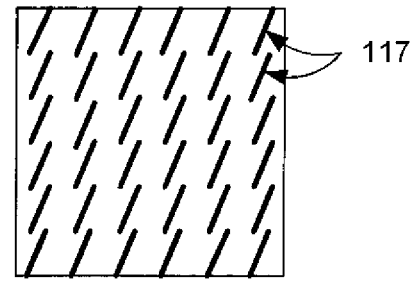
Figure 9A:
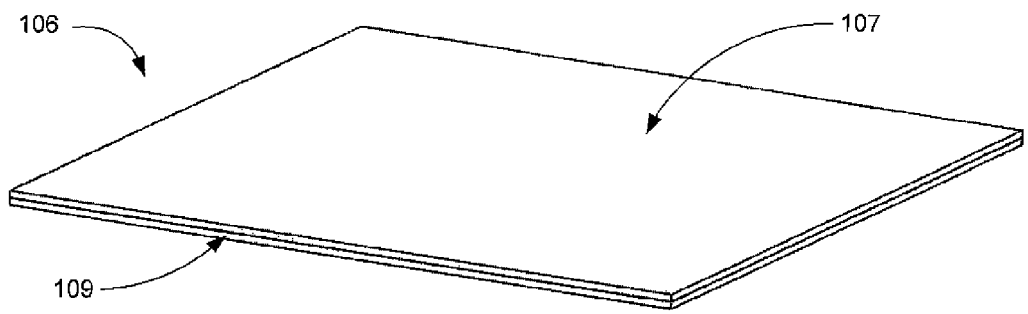
Figure 9B:
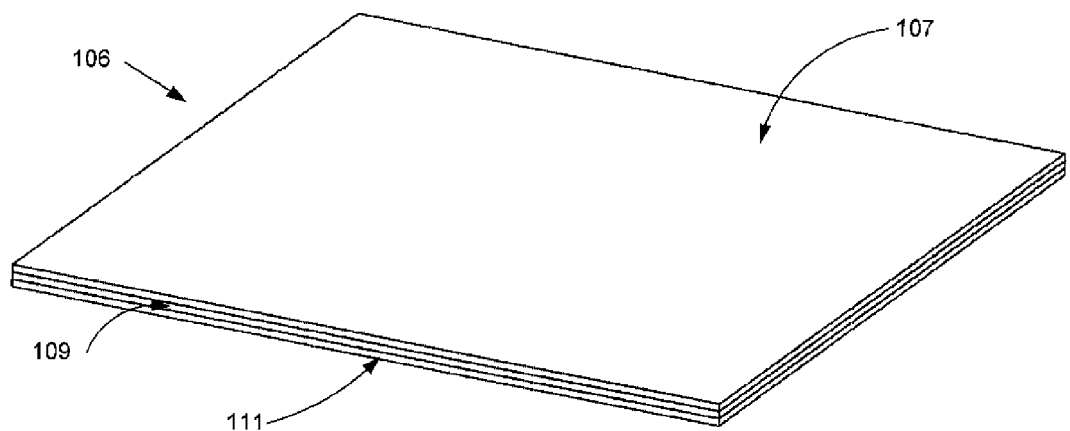
Figure 9C:
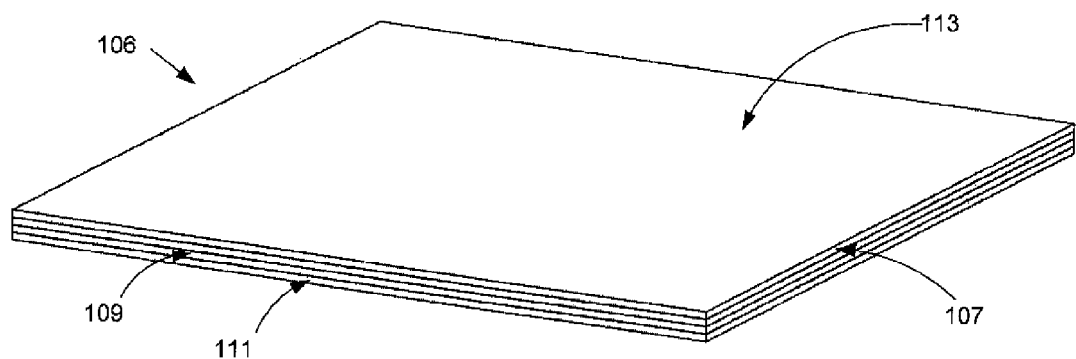
Figure 10A:
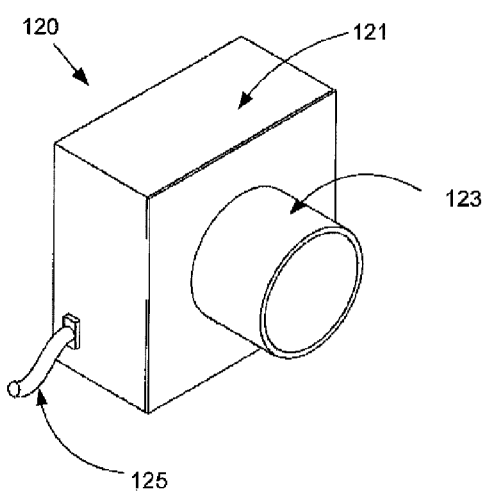
Figure 10B:
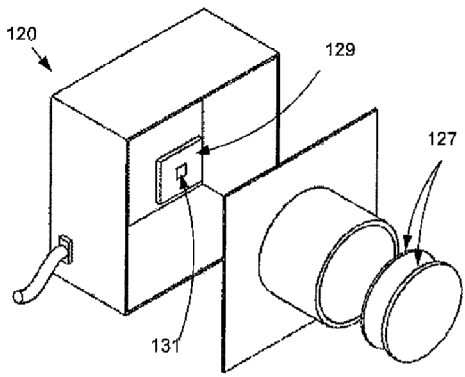
Figure 11:
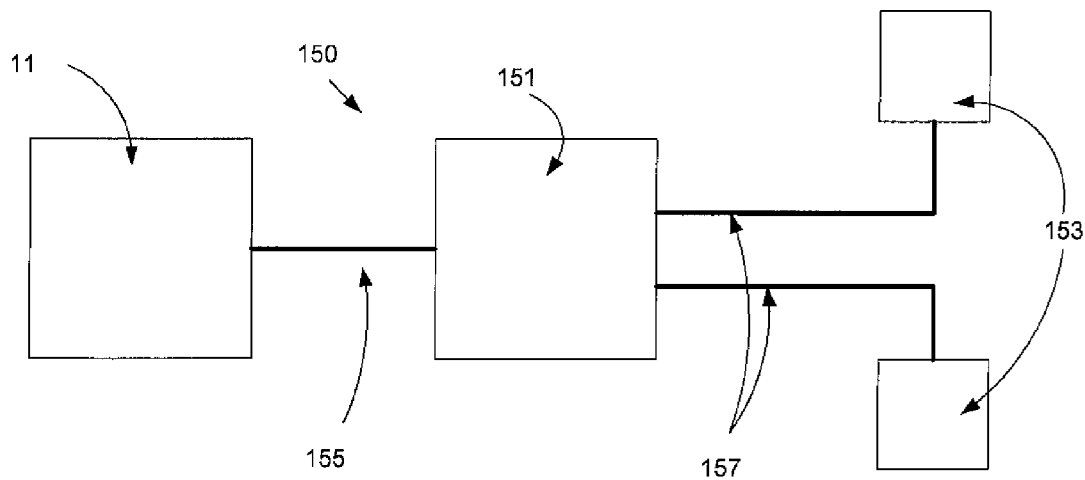
Figure 12A:
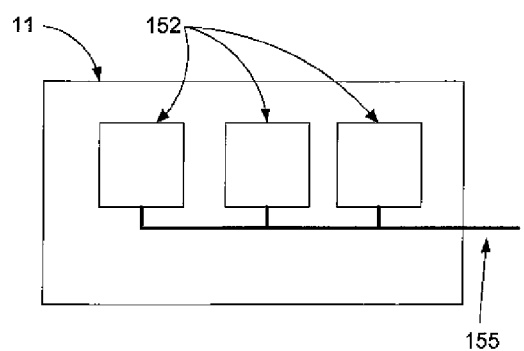
Figure 12B:
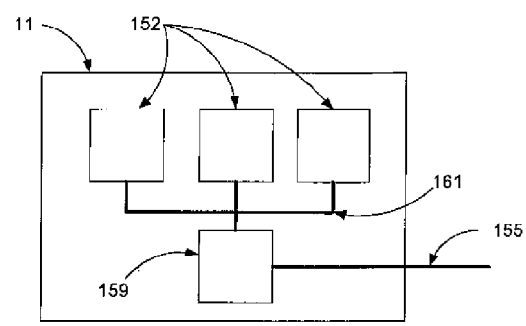
Figure 13A:
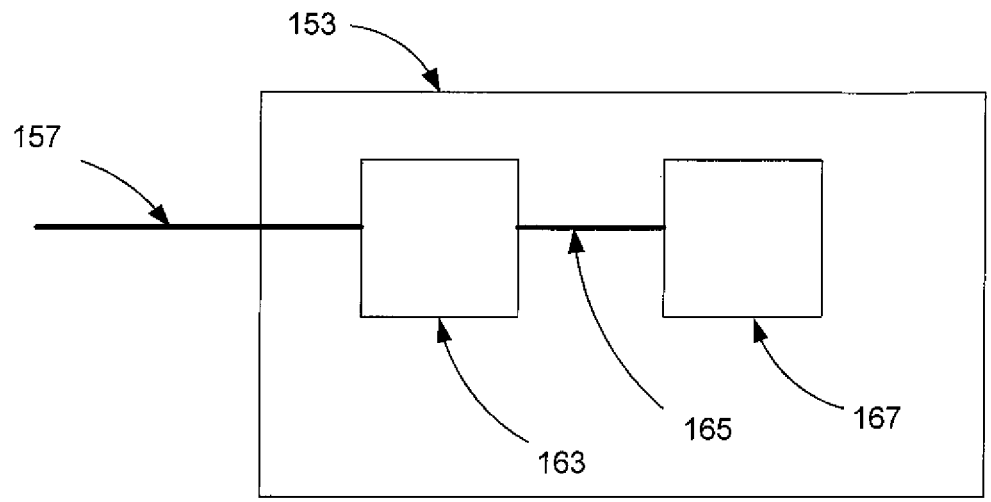
Figure 13B:
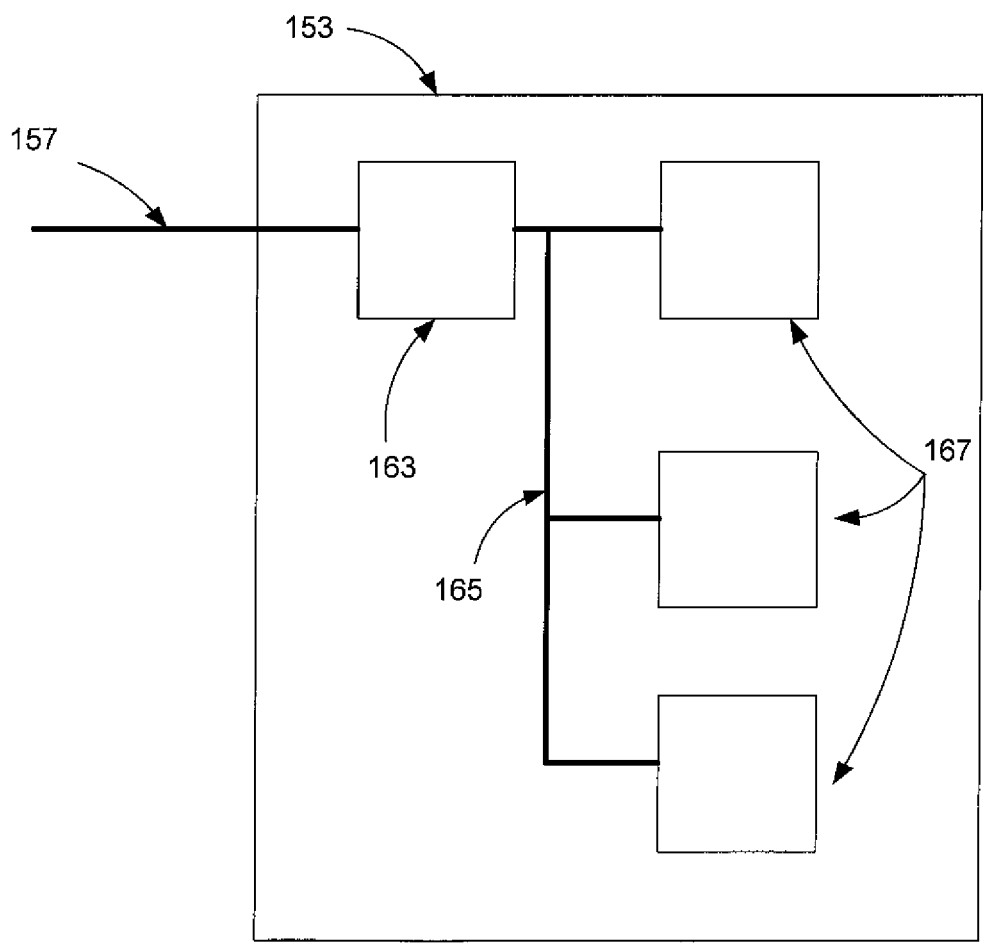

FIGS. 4A through 4D schematically show front views of exemplary reflective elements fitted with exemplary optical proxy elements of the present invention;

FIG. 5 schematically shows a front view of a linear diffraction grating;

FIG. 6A is a side view of the linear diffraction grating of FIG. 5 illuminated by an on axis light ray;

FIG. 6B is a side view of the linear diffraction grating of FIG. 5 illuminated by an off axis light ray that is orthogonal to the diffraction lines;

FIG. 7A-C is a front view of exemplary diffractive element including concentric or spiral diffraction lines;

FIG. 8A is a front view of an exemplary diffractive element including a plurality of concentric or spiral diffraction lines;

FIG. 8B is a front view illustration of observed spectra of an exemplary diffractive element;

FIG. 9A-C is a perspective view of exemplary layered optical proxy elements;

FIG. 10a shows a perspective view of an exemplary imaging device;

FIG. 10b shows an exploded perspective view of the imaging device of FIG. 10a;

FIG. 11 is a schematic diagram of an exemplary tracking control system incorporating an imaging subsystem;

FIG. 12a is a schematic diagram of an exemplary imaging subsystem;

FIG. 12b is a schematic diagram of an exemplary imaging subsystem;

FIG. 13a is a schematic diagram of an exemplary articulation subsystem;

FIG. 13b is a schematic diagram of an exemplary articulation subsystem.

Figure 14A:
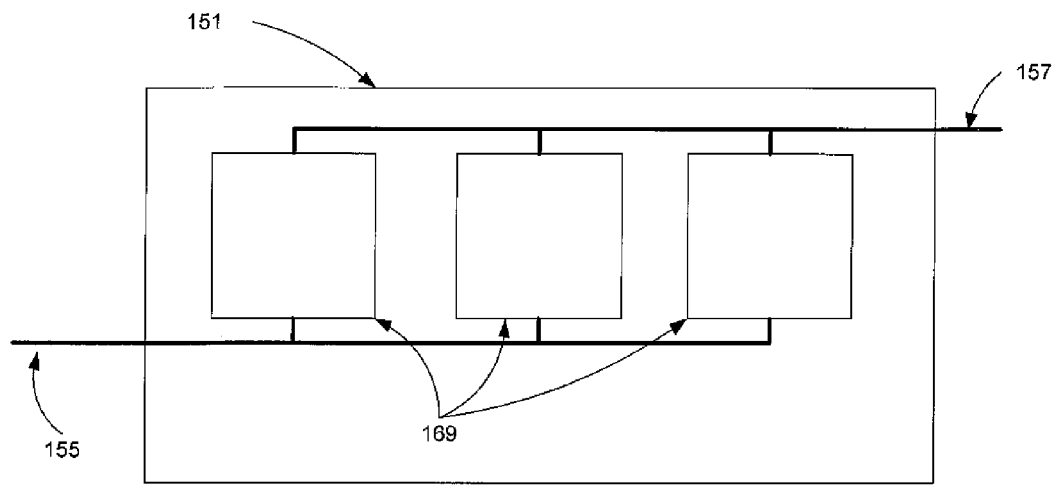
Figure 14B:
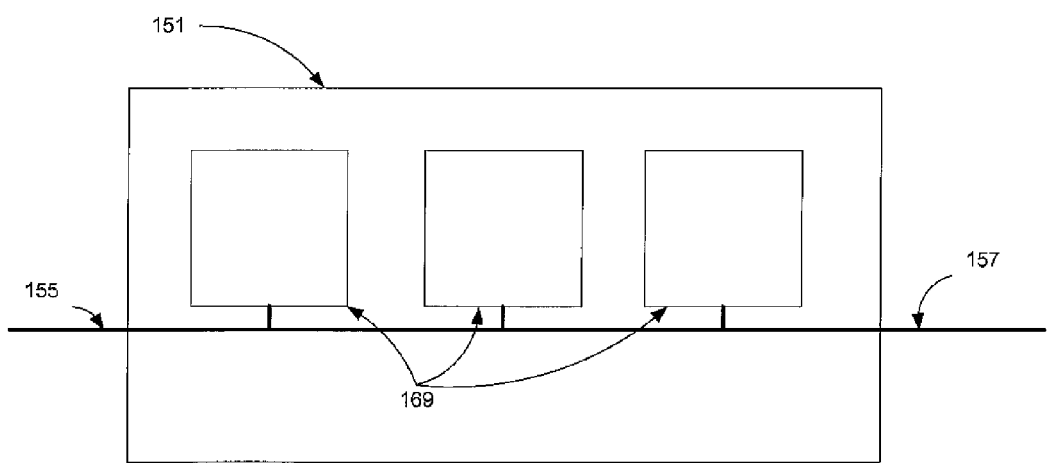
Figure 15:
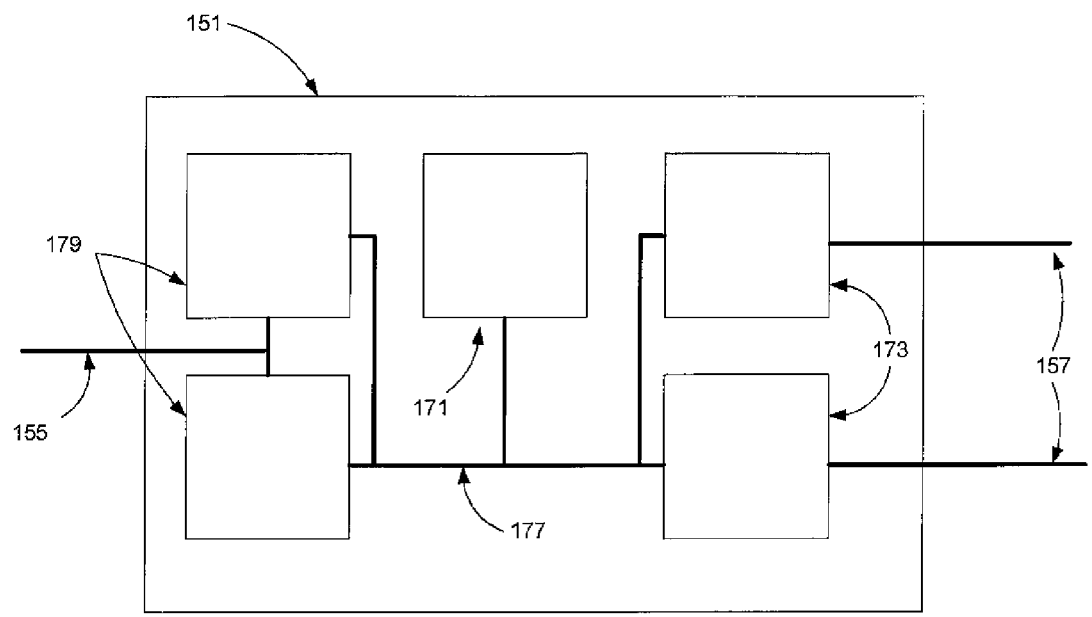
Figure 16A:
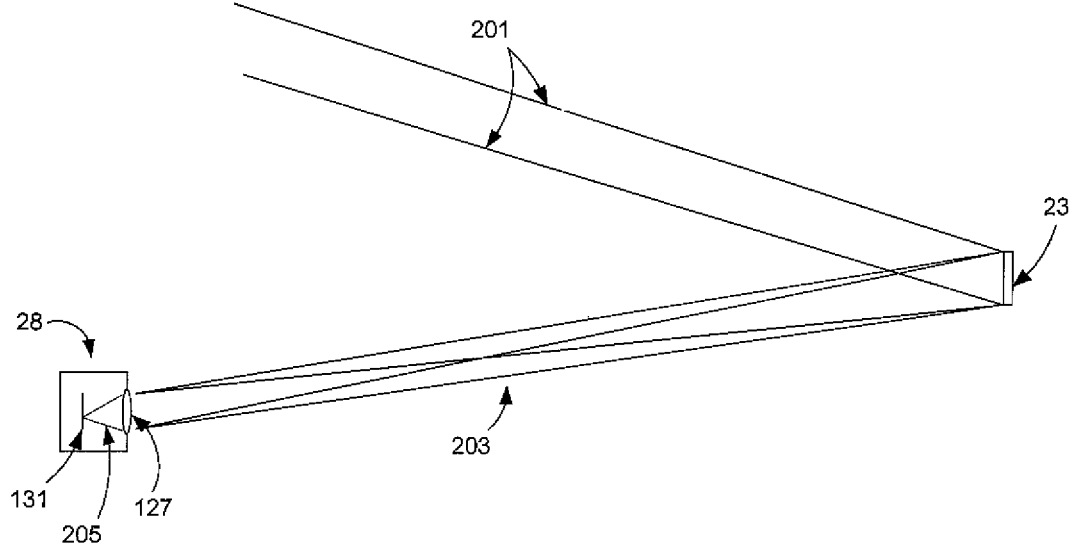
Figure 16B:
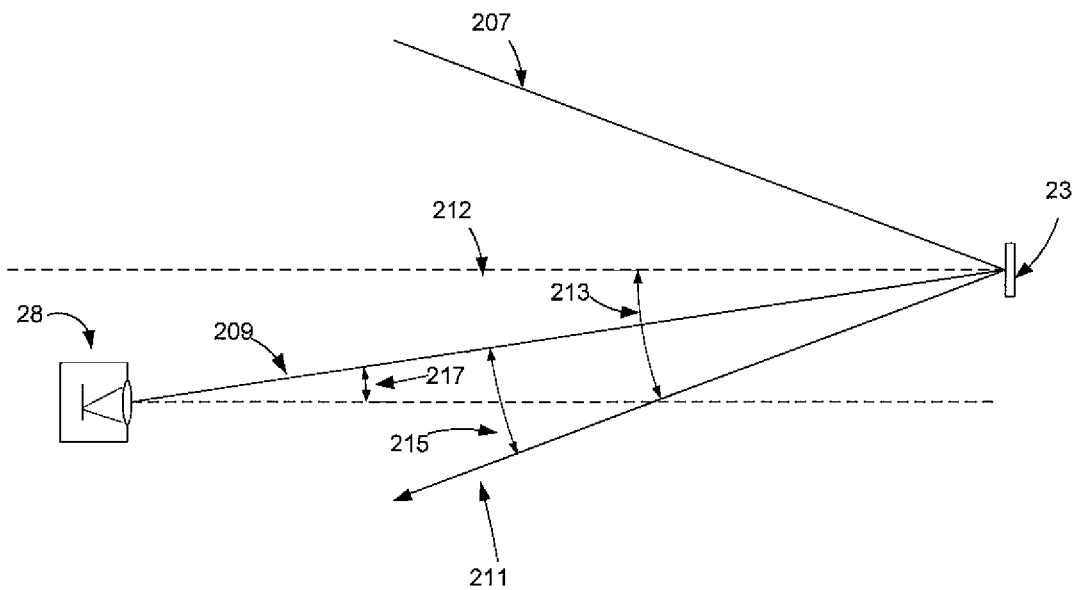
Figure 16C:
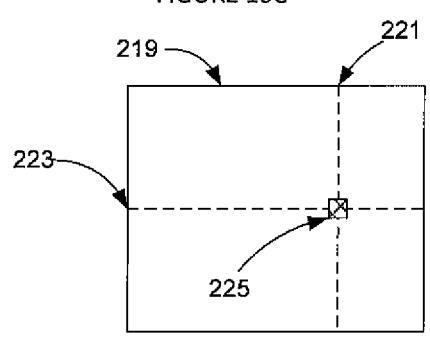
Figure 17:
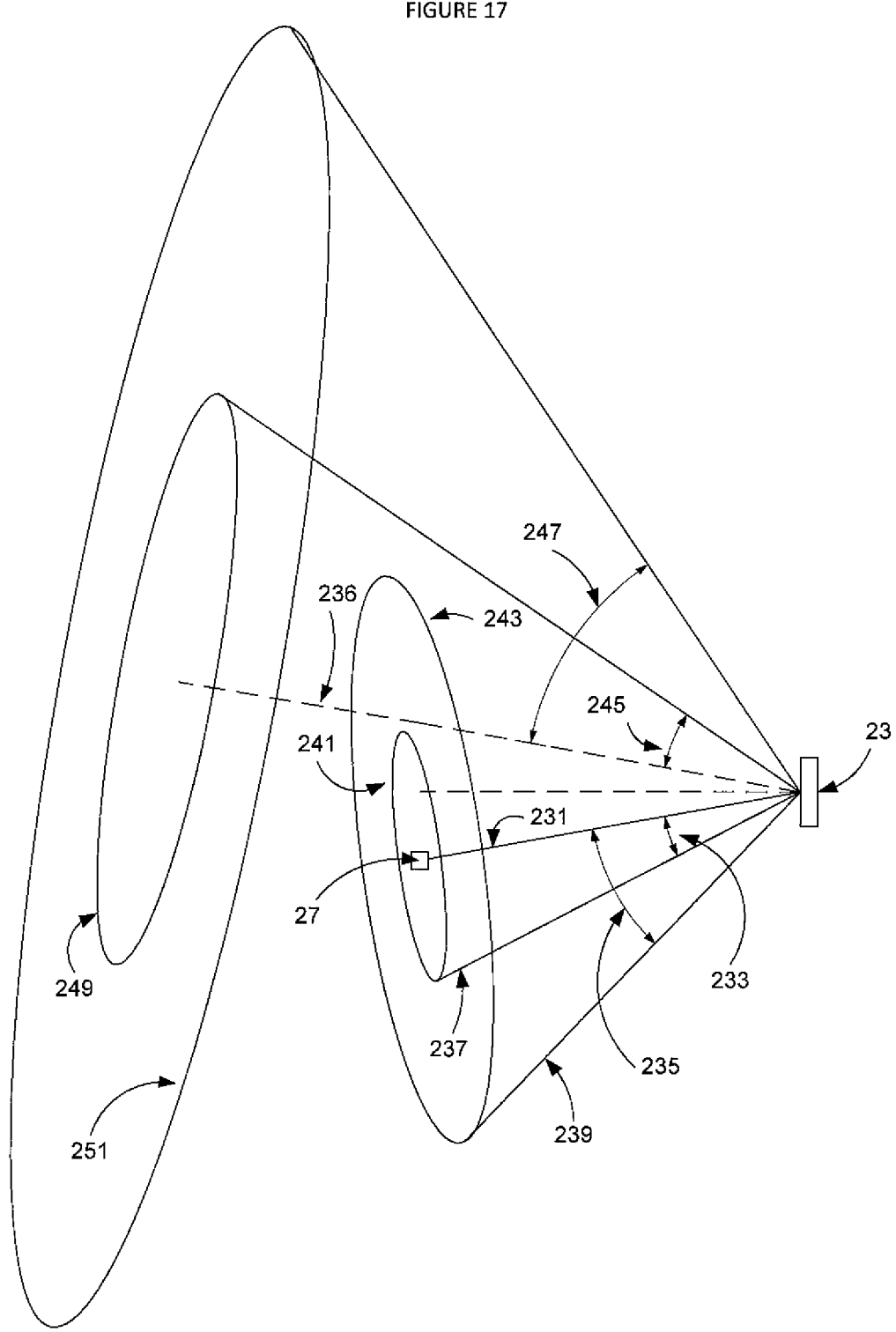
Figure 18:
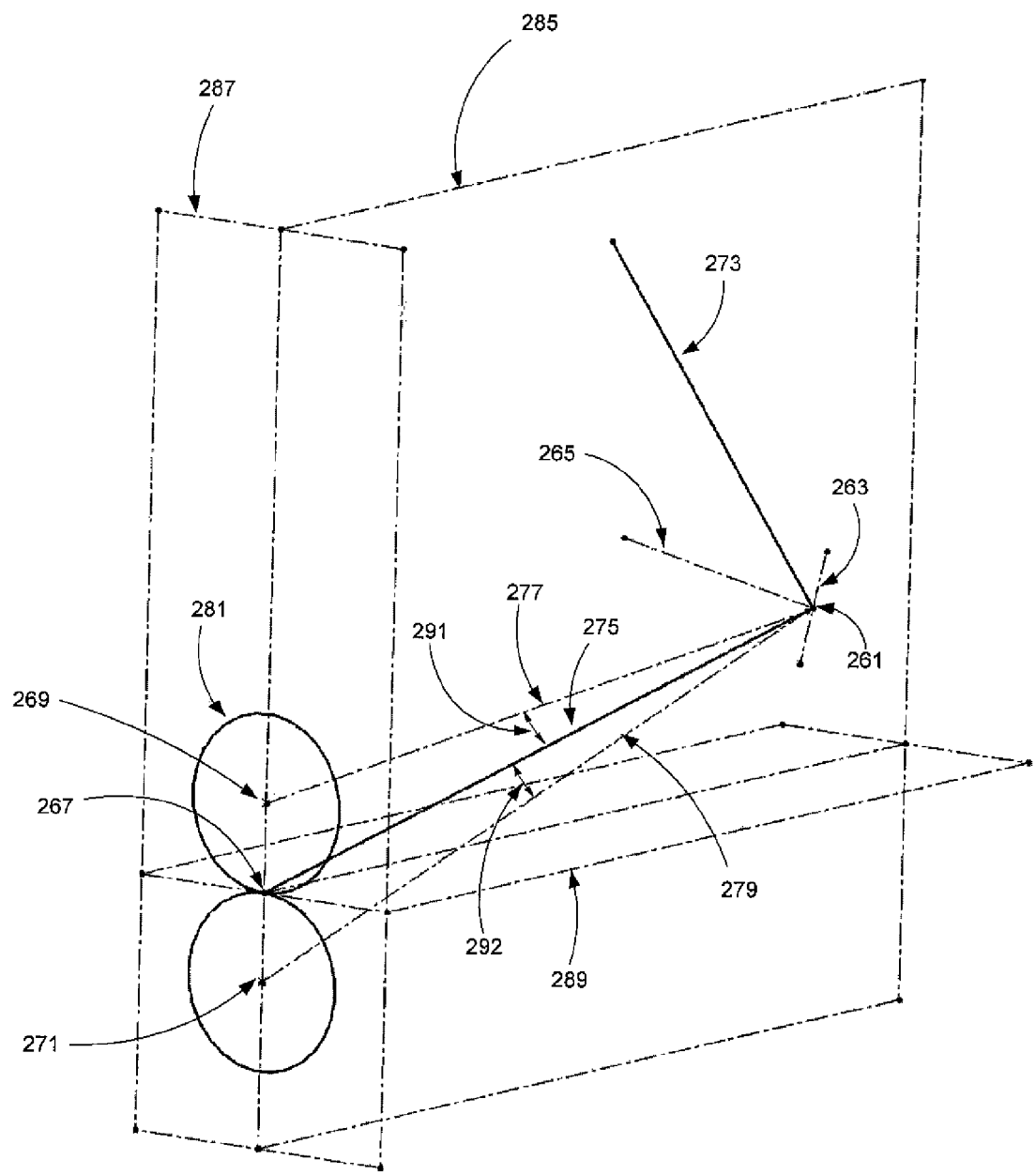
Figure 19:
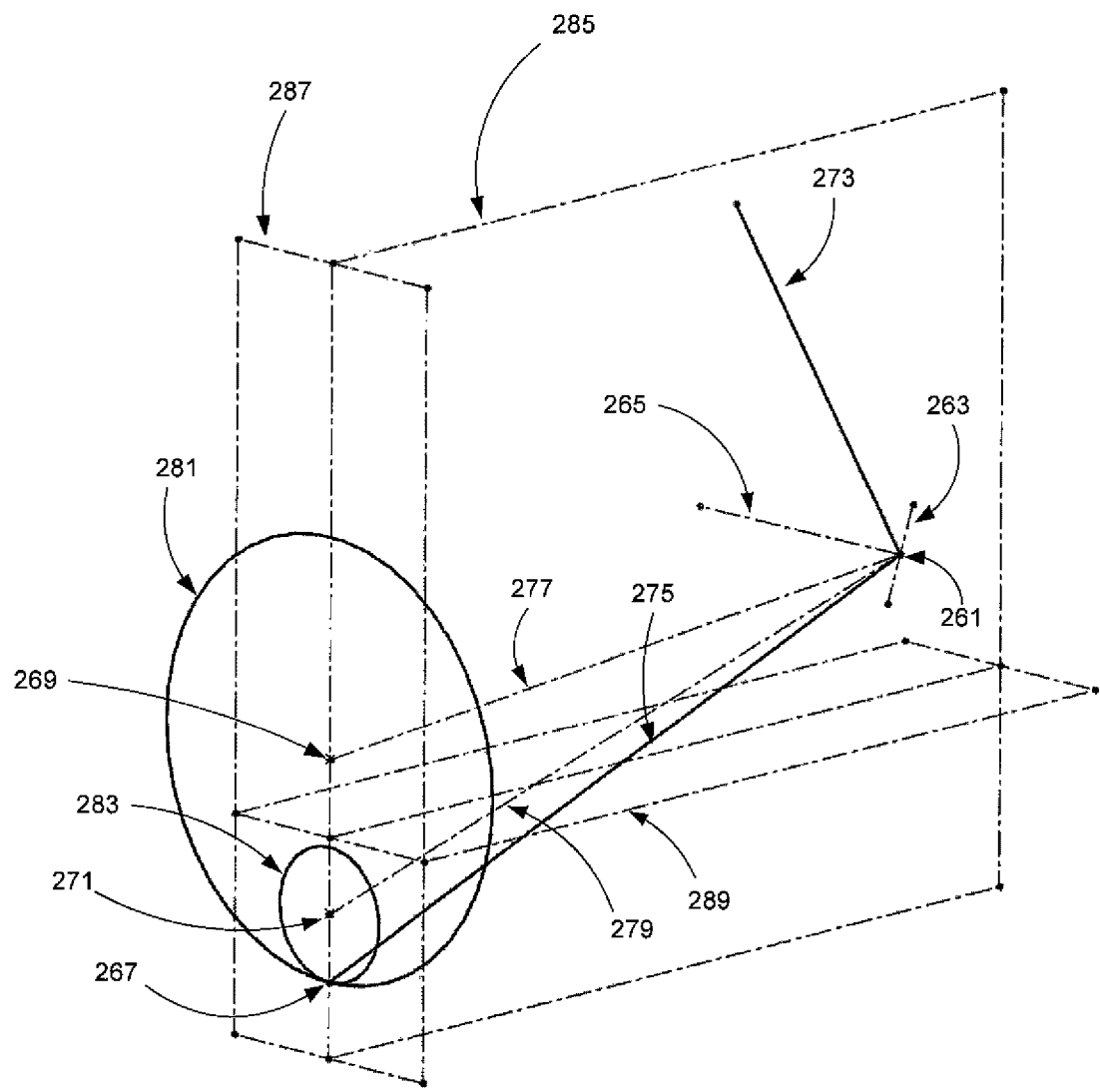
Figure 20:
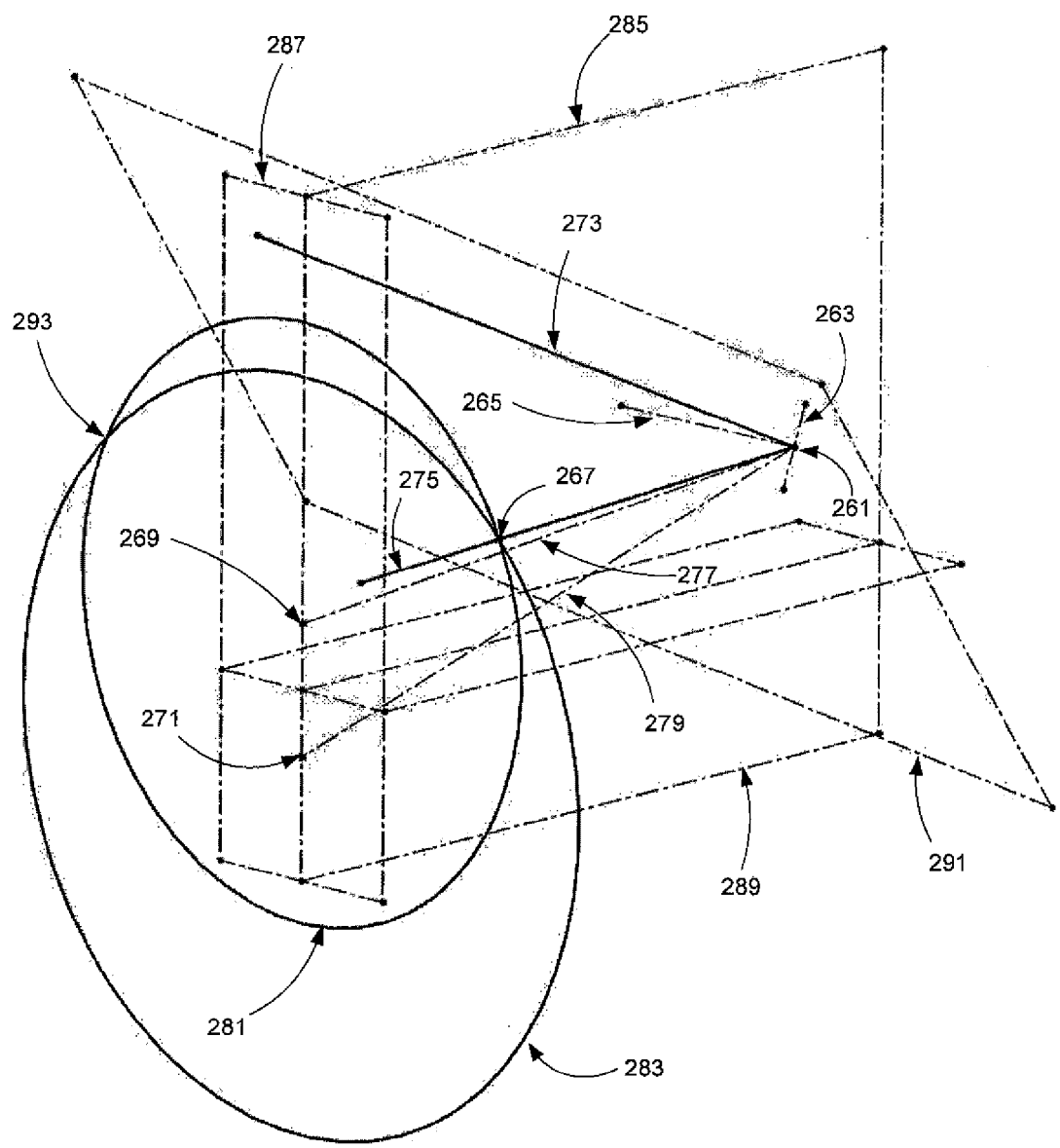
Figure 21:
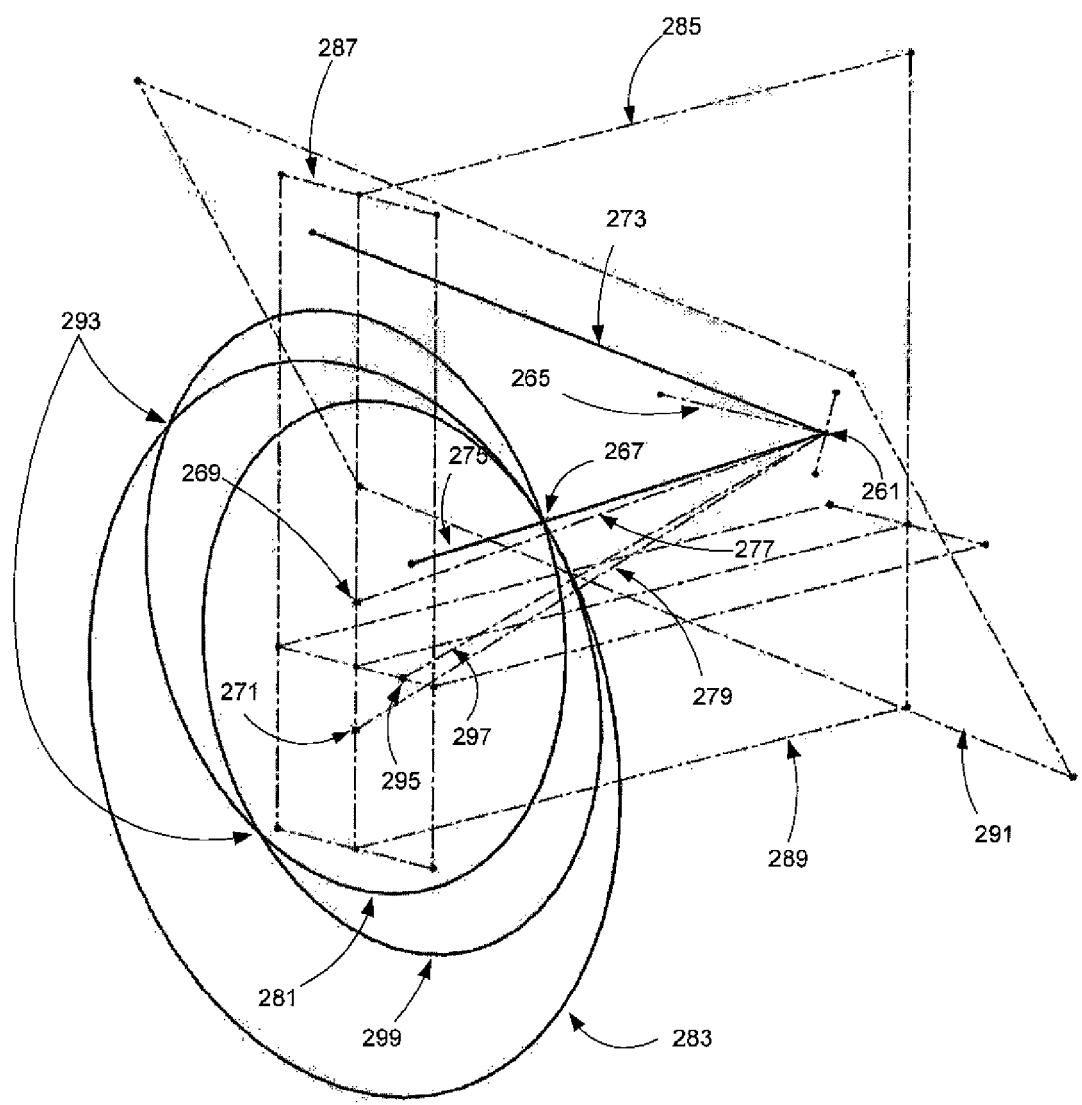
Figure 22:
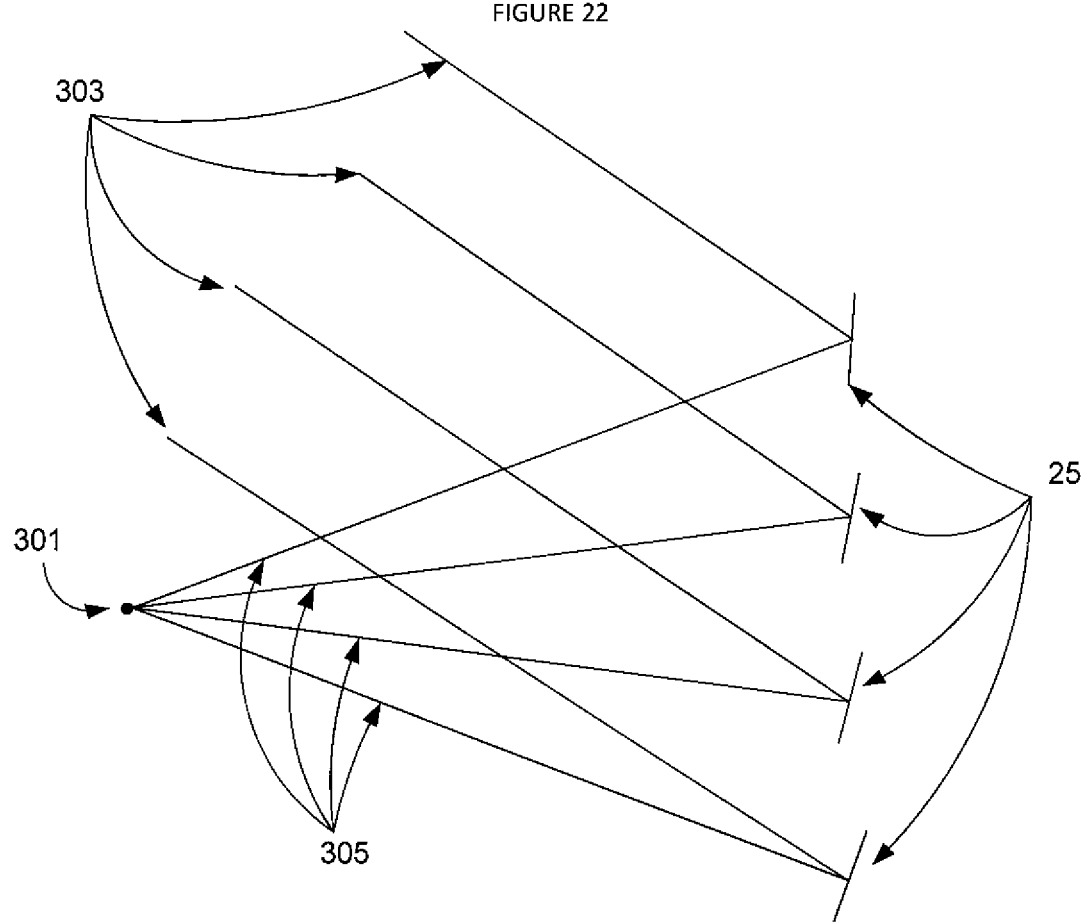
Figure 23:
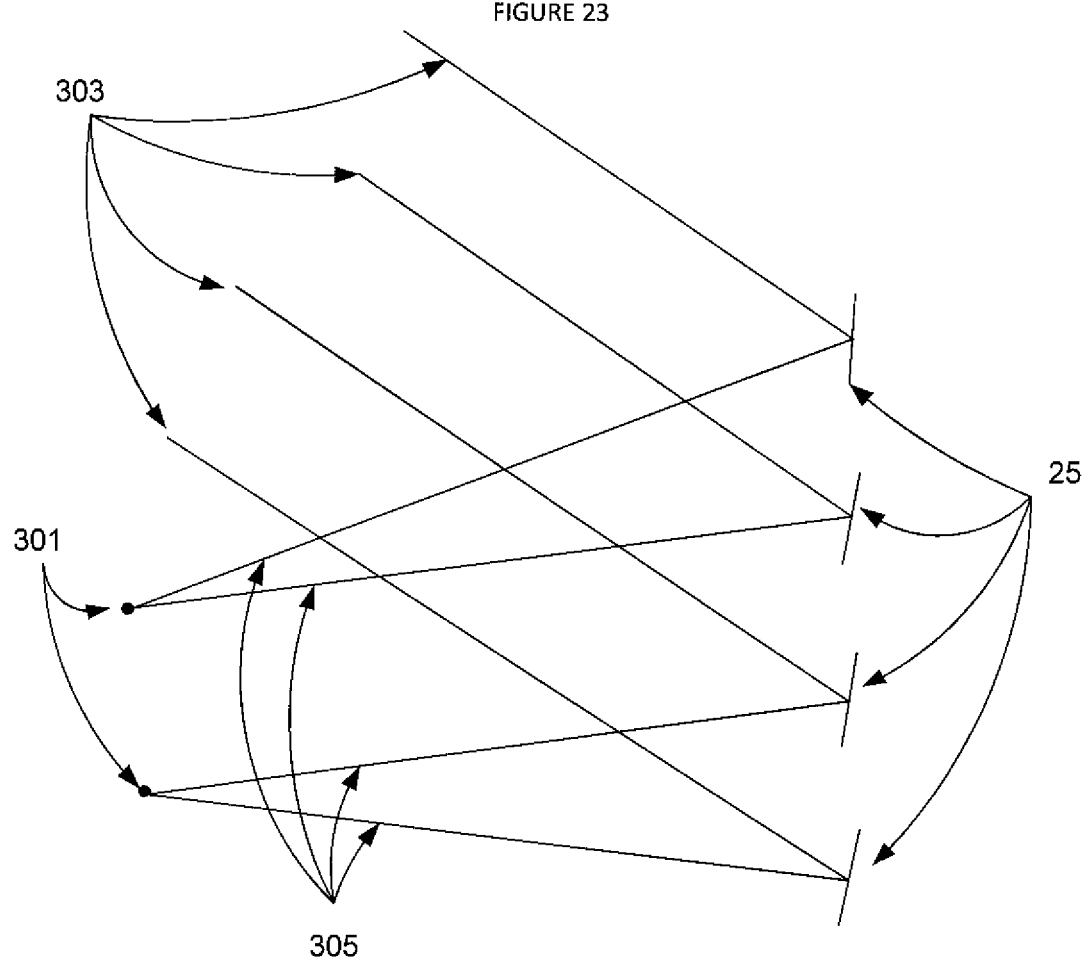
Figure 24:
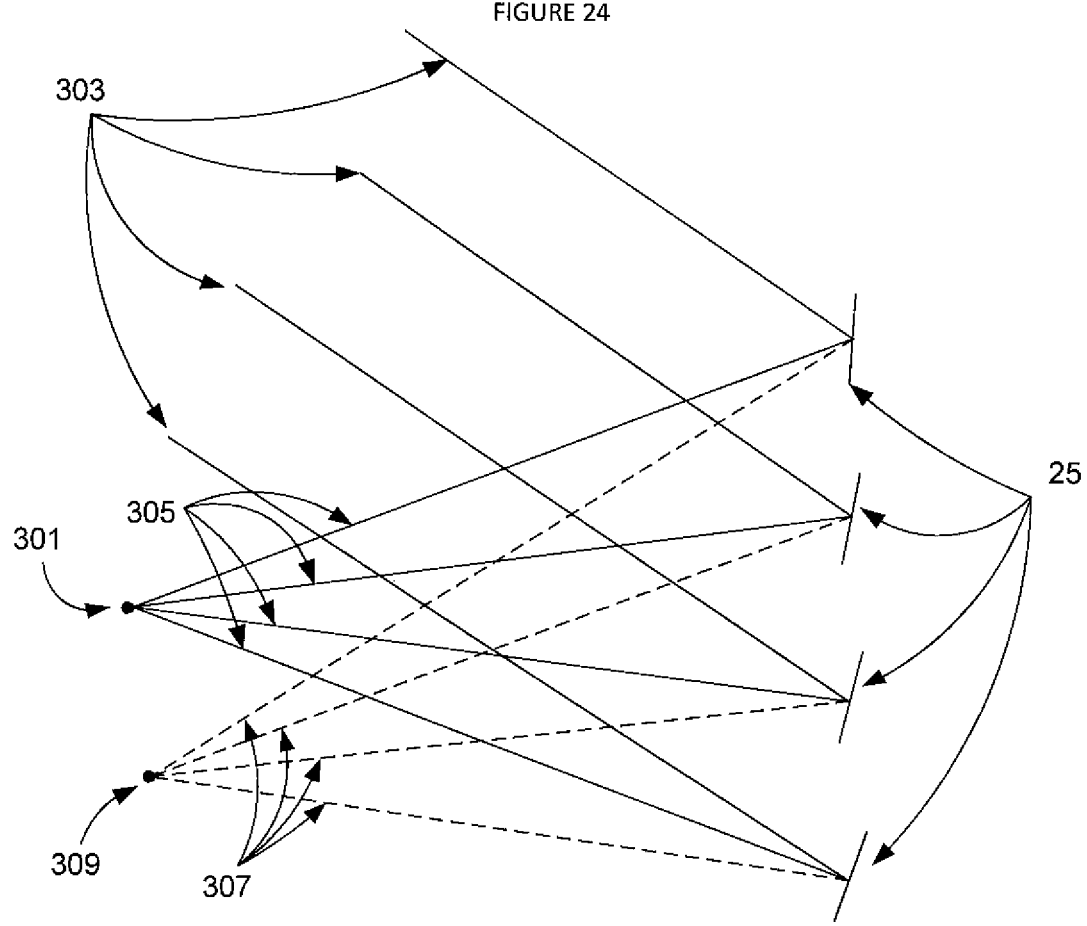
Figure 25:
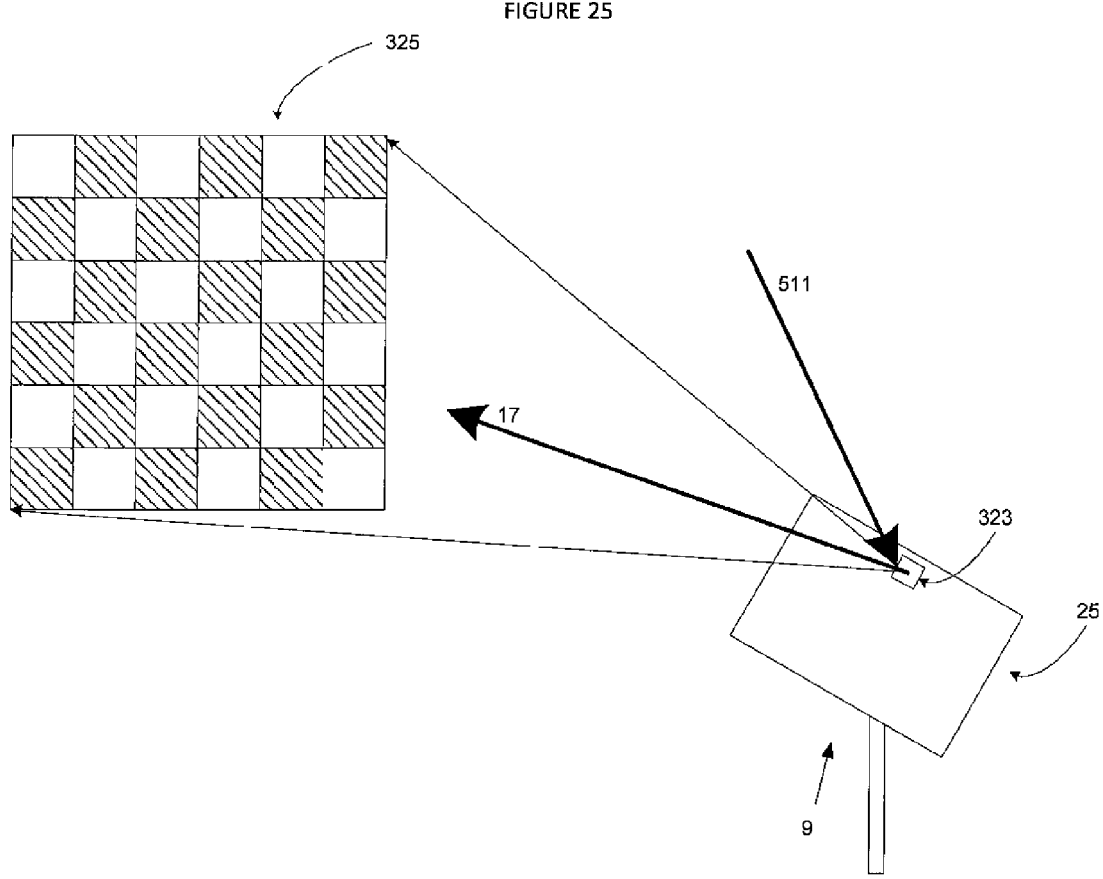
Figure 26:
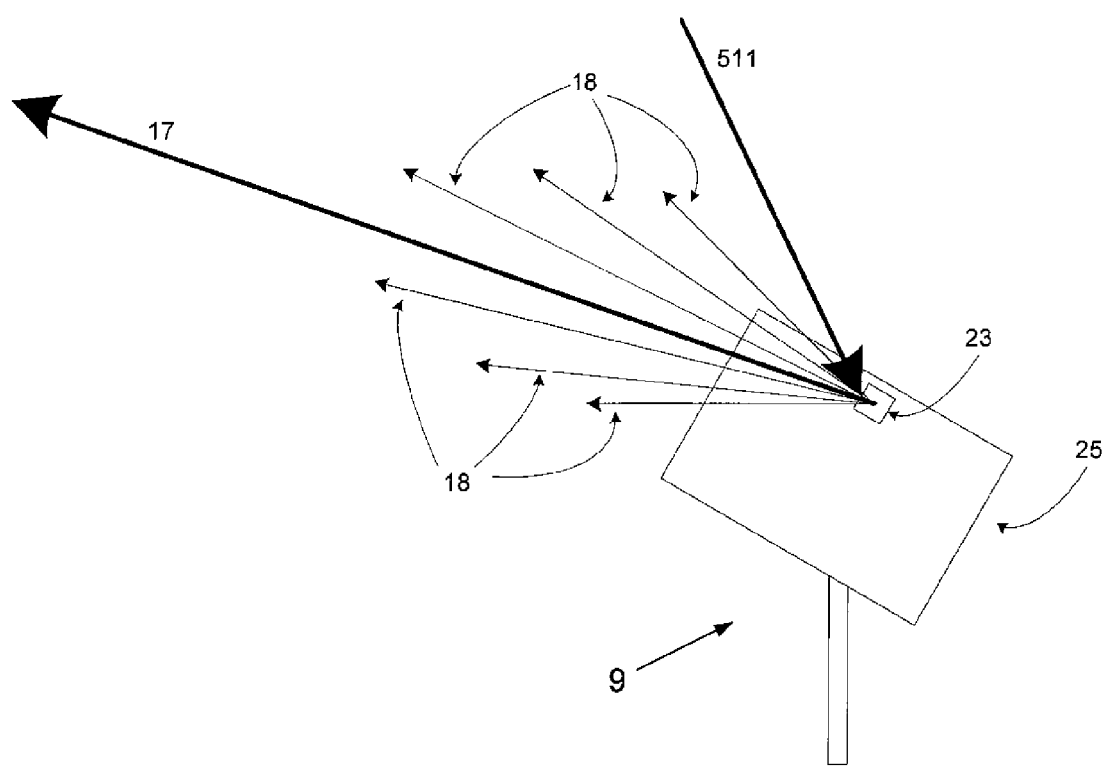
Figure 27:
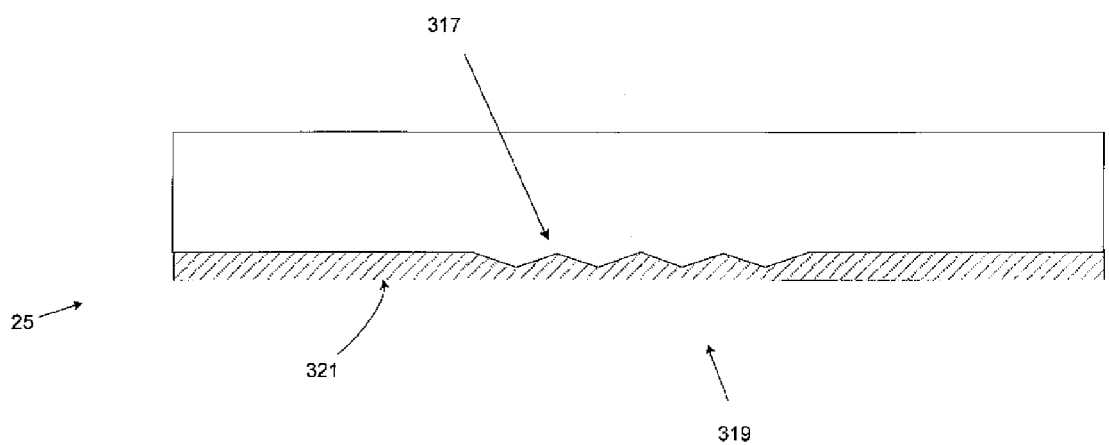
Figure 28:
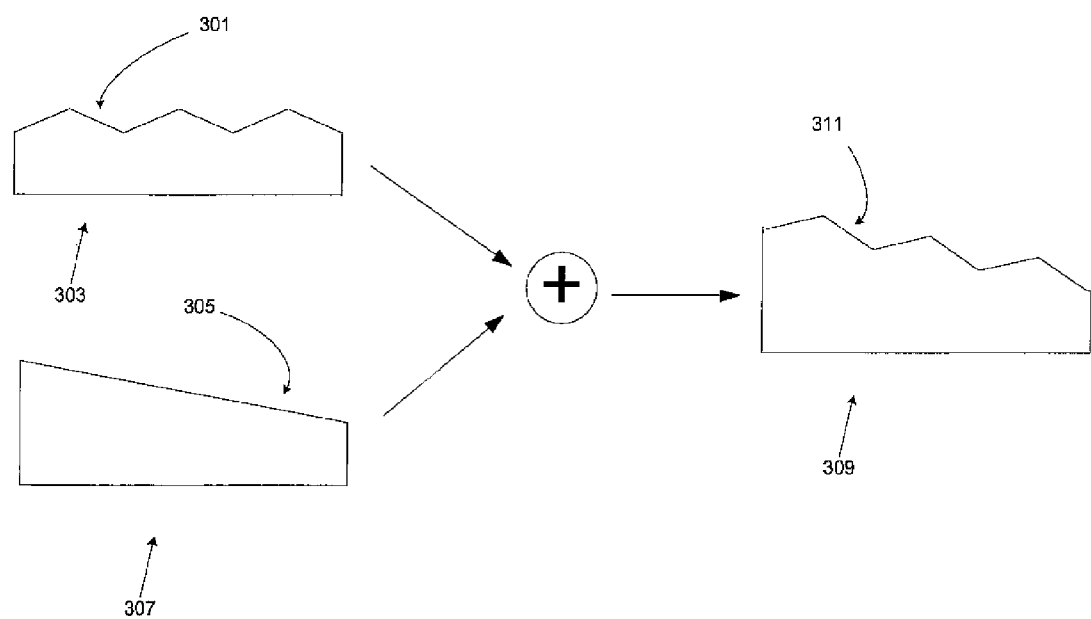
Figure 29:
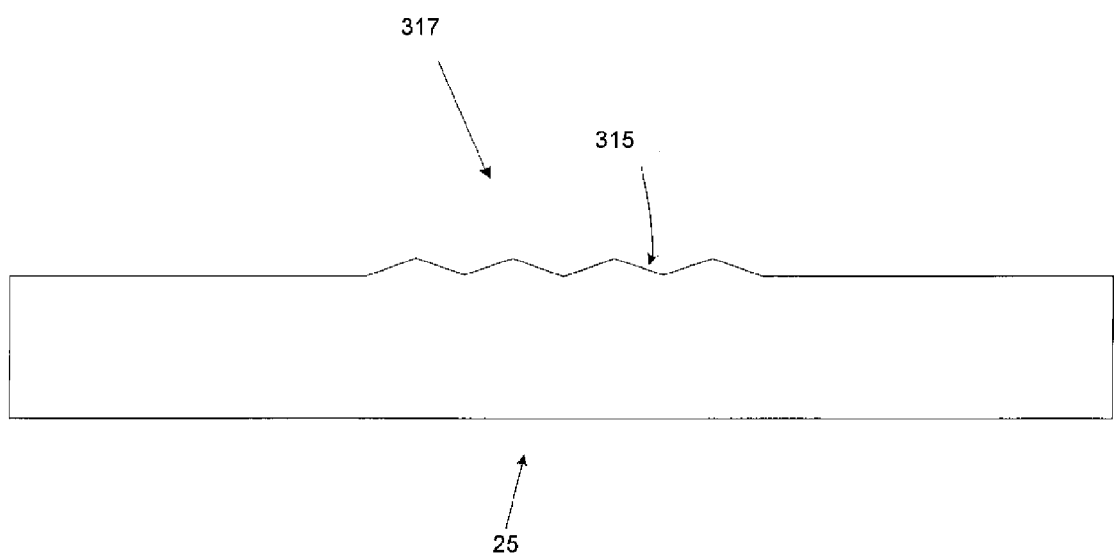

FIG. 14A-B is a schematic diagram of an exemplary computation subsystem;

FIG. 15 is a schematic diagram of an alternate exemplary computation subsystem;

FIG. 16A-C is an exemplary 2D ray trace of an optical proxy element;

FIG. 17 is an exemplary perspective ray trace of an optical proxy element;

FIG. 18 is an exemplary perspective ray trace of an optical proxy element from two viewpoints;

FIG. 19 is an exemplary perspective ray trace of an optical proxy element from two viewpoints;

FIG. 20 is an exemplary perspective ray trace of an optical proxy element from two viewpoints;

FIG. 21 is an exemplary perspective ray trace of an optical proxy element from three viewpoints;

FIG. 22 is an exemplary tracking system with a single target;

FIG. 23 is an exemplary tracking system with a plurality of targets;

FIG. 24 is an exemplary tracking system with a plurality of targets;

FIG. 25 is a diagram illustrating an optical proxy that projects a digital checkerboard pattern;

FIG. 26 is a perspective view of an exemplary heliostat with an exemplary optical proxy broadcasting light into a proxy beam;

FIG. 27 is a view of a light redirecting element with an optical proxy element integral to its back side;

FIG. 28 is an illustration of the superposition of two optical element surface profiles to create a single composite optical proxy and FIG. 29 is an illustration of a light redirecting element with an integral optical proxy.

DETAILED DESCRIPTION OF THE PREFERRED EMBODIMENTS

The apparatus and methods presented herein describe closed loop tracking systems that use devices that distribute light and/or modify one or more properties of light, such as wavelength, intensity, polarization, or any other useful property, to sense orientation and effect articulation of a plurality of light redirecting elements in a preferred manner. Embodiments described herein are exemplary and do not represent all possible embodiments of the principles taught by the present invention. In particular, embodiments of the present invention have direct application in the field of concentrating solar power, particularly concentrating solar power including the use of heliostats to redirect sunlight onto a fixed focus in which concentrated sunlight may be converted into other forms of energy such as heat or electrical energy. Nevertheless, the apparatus and methods described herein can be applied and adapted by those skilled in the art for use in alternative applications in which light from a source must be redirected onto a plurality of targets, particularly light from a source that is not stationary.

FIGS. 2A-2C and 3 show an exemplary CSP system 1 incorporating principles of the present invention that is deployed for purposes of illustration on mounting surface 21, which may be a roof of a building in some embodiments. For purposes of illustration, CSP system 1 is described with respect to use of optical proxies 23 in the form of diffractive elements. Other kinds of optical proxies, described below, may be used in system 1 or other modes of practice. CSP system 1 includes an array of heliostats 9 that redirect and concentrate sunlight onto focus area 7 of tower 5. An imaging subsystem 11 comprising imaging detectors 28 is mounted to tower 5 to detect diffraction information produced by heliostats 9.

A control system (not shown) uses the detected optical information from the optical proxy in a closed loop control system to articulate and thereby aim redirected sunlight from the heliostats 9 onto focus area 7. The control system desirably comprises a plurality of computational devices (not shown) coupled electronically to imaging subsystem 11 and heliostats 9. The control system includes software to process diffraction information acquired by imaging subsystem 11 in order to effect articulation of the plurality of heliostats 9 for the purpose of controllably redirecting sunlight onto the system focus area 7.

Each heliostat 9 generally comprises at least one optical proxy 23, a light redirecting element in the form of reflecting element 25, and a support structure including pivot mechanisms 27 and 31, mechanical support 33, and base 35. The optical proxy 23 and its associated reflecting element 25 form an assembly that articulates so that the assembly can track the sun and aim redirected sunlight onto the focus area of tower 5. Optical proxy 23 is coupled to reflecting element 25 so that the optical information produced from the optical proxy 23 can be used to controllably aim light redirecting element 25 via aiming strategies comprising closed loop control techniques optionally in combination with other control strategies, e.g, open loop control and/or feedforward techniques. In particular, imaging subsystem 11 detects optical information produced by optical proxy 23. The information correlates to the manner in which reflecting element 25 is aimed. Accordingly, the information can be used to articulate reflecting element 25 in a manner effective to correct and/or maintain the aim of redirected light onto focus area 7.

Pivot mechanism 31 is mechanically coupled to support structure 34 and incorporates tip axis 33 such that tip axis 33 is fixed relative to the orientation of the support structure 34. Pivot mechanism 27 is pivotably coupled to pivot mechanism 31 and can be actuated to pivot on tip axis 33. Pivot mechanism 27 incorporates tilt axis 29 such that tilt axis 29 has an orientation that is a function of the rotation of pivot mechanism 31 about the tip axis 33. Reflecting element 25 is pivotably coupled to pivot mechanism 27 and can be actuated to pivot on tilt axis 29. Pivot mechanisms 27 and 31 provide two degrees of rotational freedom about axes 29 and 33, respectively, for articulating the reflecting element 25 and optical proxy 23. The orientation and position of reflecting element 25 and optical proxy 23 are thereby affected by both rotational degrees of freedom provided by tip axis 33 and tilt axis 29. In the embodiment shown tilt axis 29 and tip axis 33 are substantially orthogonal to each other but do not lie on the same plane. Articulation of the components around axes 29 and 33 allows the reflecting element 25 to be controllably aimed at focus area 7.

The embodiment of heliostat 9 shown in FIGS. 2A-2C and 3 incorporates two rotational degrees of freedom for articulating the optical proxy 23 and reflecting element 25. In an alternative embodiment, the orientation and position of the optical proxy 23 and reflecting element 25 may be affected by zero or more rotational degrees of freedom and one or more translational degrees of freedom. In yet another alternative embodiment, the orientation and position of the optical proxy 23 and reflecting element 25 may be affected by one or more rotational degrees of freedom and zero or more translational degrees of freedom.

Figure 1:
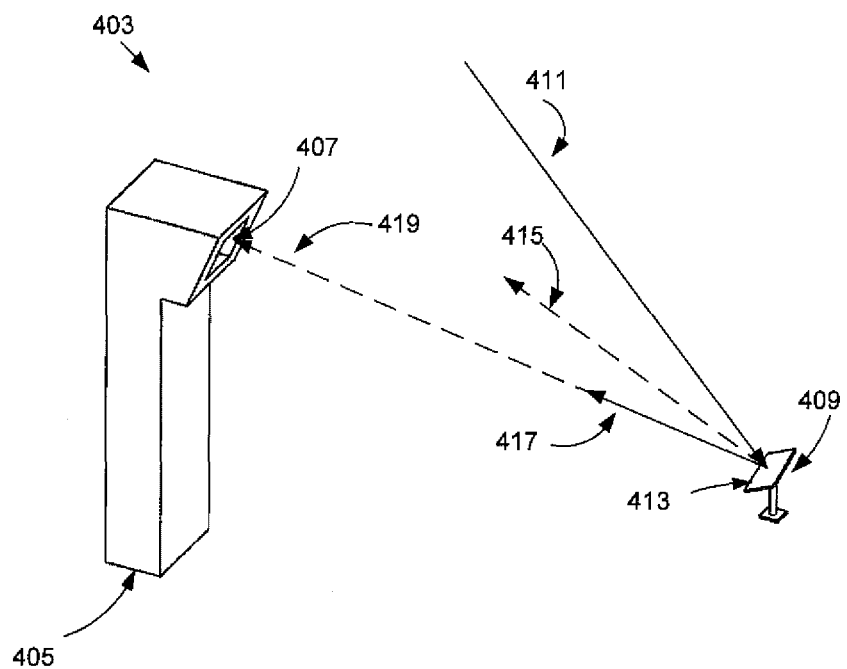
FIG. 1 is a simplified perspective view of an exemplary concentrating solar power system.
Figure 2A:
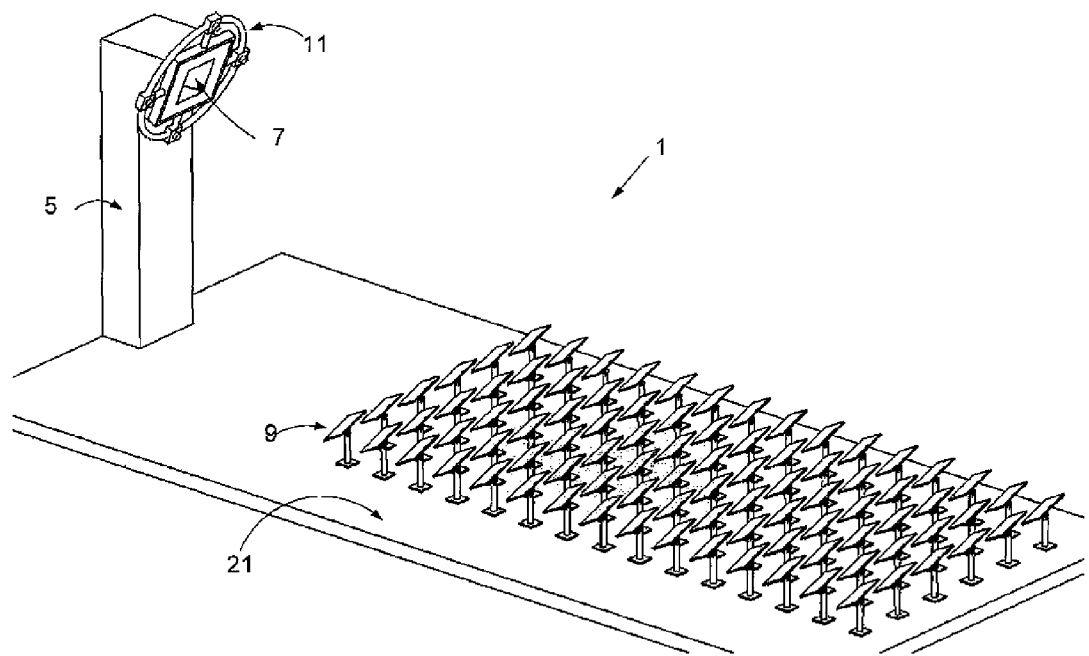
FIG. 2A is a perspective view of an exemplary embodiment of the present invention applied to a concentrating solar power system.

Optical proxy 23 preferably is located on reflective element 25 in such a manner that optical proxy 23 can be observed by imaging subsystem 11 irrespective of orientation of reflective element 25 over the functional articulation range of heliostat 9. For purposes of illustration, FIG. 2c shows optical proxy 23 centrally located along a top edge of reflecting element 25. Other positioning strategies may be used such as those described below with respect to FIGS. 4A-4D.

In addition to the functional articulation range of individual heliostat devices 9, the ability to observe optical proxy 23 by imaging subsystem 11 is affected by the position and orientation of the heliostats 9 relative to the imaging subsystem 11 and the proximity of heliostats 9 to one another. Consequently it is possible in some embodiments that portions of reflecting element 25 might be obstructed by one or more other reflecting elements 25 of other heliostats 9 from the viewpoint of the imaging subsystem 11. Because of this, in some embodiments there may be regions on reflective surface 25 where it is not practical to locate optical proxy 23.

Optical proxy 23 preferably has a sufficient size such that optical proxy 23 can be resolved by imaging subsystem 11 over the functional articulation range of heliostat 9. At the same time, it is often preferable to minimize the area of optical proxy or proxies 23 such that these occupy a small fraction of the total area of reflecting element 25. This is particularly true in the case of a concentrating solar power system in which efficiency is affected by the net reflecting area of the heliostat 9. Consequently the minimum size of optical proxy 23 is dependent on the resolution of imaging subsystem 11, and the location of the optical proxy 23 relative to the imaging subsystem 11. As a limiting factor, the minimum area of optical proxy 23 is determined by the resolution of the imaging subsystem 11 and the location of the most distant heliostat 9 in the system 3.

In one embodiment of tracking control system 1, all optical proxies 23 among the heliostats 9 or a particular subset of heliostats 9 have areas that are substantially uniform in magnitude. Having all optical proxies substantially uniform in size advantageously reduces manufacturing complexity and requires less specificity when installing heliostats 9 to ensure that heliostats 9 are located properly relative to imaging subsystem 11. A disadvantage of this embodiment is that the amount of power that could be generated by a given CSP system is not maximized, as some of the optical proxies 23 will be larger than needed to ensure that all the elements 23 in the array can be resolved by the imaging subsystem 11 regardless of distance from subsystem 11.

An alternative embodiment incorporates optical proxies 23 having a plurality of sizes such that the area of optical proxies 23 is correlated, e.g., inversely proportional, to their distance from imaging subsystem 11. The embodiment has an advantage in that it can be designed so that the effective area of optical proxies 23 in the image space of imaging subsystem 11 is substantially uniform. Additionally this embodiment increases the total throughput of a CSP system by minimizing parasitic losses from optical proxies 23 that are too large with respect to some heliostats 9. The major disadvantage to this embodiment is in increased manufacturing and installation complexity.

FIGS. 2A-2C and 3 show an optical proxy 23 that occupies a relatively small portion of the area of light redirecting element 25. Alternative embodiments may be tolerant to optical proxies of more significant area relative to the light redirecting element on which the one or more optical proxies are mounted. In some embodiments in which the light redirecting element is a mirror, the optical proxy also is substantially reflective, and thus mirror-like, and may cover a substantial portion (e.g., more than 20%, more than 50%, even more than 75%, and even substantially all) of the mirror surface. Such large area proxies may have low efficiency, for example, 20% or lower, or even 10% or lower, or even 1% or lower efficiency. Consequently, the optical proxy acts only on a portion of the incident light. The remainder of the light from the source, such as the sun, is not modified by the presence of the optical proxy and is either reflected, or transmitted to the mirror, to be redirected for solar concentration. This helps to facilitate use of large optical proxies and corresponding easier image detection without significantly sacrificing total throughput from the light redirecting elements. This also advantageously reduces the resolution of the imaging system required to detect the signal from the optical proxy. In such embodiments, the efficiency of the optical proxy is preferably very low, for example 1% or lower efficiency, so that most of the light is still redirected by the light redirecting element.

In such embodiments, the optical proxy is often preferably a transmissive optical element, so that light is able to pass through the optical proxy to reach the light redirecting element. In some embodiments, however, the optical proxy may be a reflective element. In this case, the optical proxy subsumes the optical functions of the light redirecting element. In some such embodiments, the optical proxy is a thin reflective film applied to the underlying glass substrate of the light redirecting element.

FIGS. 2A-2C and 3 show an optical proxy 23 in which element 23 is a separate component that is mounted to light redirecting element 25. In some embodiments, some or all of the optical proxies may be integral to the light redirecting element. For example, as shown in FIG. 29 the surface of the light redirecting element 25 may comprise the desired surface profile 315 of the optical proxy 317. Any of the alternative optical functions of the optical proxies described herein may be incorporated into proxy 317, including but not limited to diffraction, diffusion, polarization, and/or the like. The element 25 may incorporate a plurality of proxies that may be heterogeneous elements comprising a plurality of sub-elements of a plurality of types and/or composite elements based on superposition.

As shown in FIG. 27, in many embodiments where the optical proxy is integral to or encapsulated in the light redirector 25, it is preferably integral to, attached to, or embedded in the back side 319 of the light redirector. The "back side" means the side of redirector 25 that is most protected from the elements or ultraviolet radiation. The redirector 25 and the proxy still are positioned in a manner to optically interact with incident light. FIG. 27 illustrates a light redirector that is a mirror, with a backside reflective coating 321. Other embodiments place the optical proxy on the front side and comprise a transparent protective coating to help protect the optical proxy from degradation.

In embodiments where the light redirector is reflective, the optical proxy may be either reflective or transmissive. In either case, the optical proxy beam is desirably a reflected beam as well; the optical proxy can provide its own reflecting surface, or it can rely on the reflective surface of the light redirector. If the reflective surface of the light redirector is used, light will pass through the transmissive optical proxy twice, resulting in a multiplied effect, which may be advantageous in some cases. In many embodiments with light redirectors that are transmissive, the optical proxy is also transmissive. By way of example, one instance of a light redirector may be a spotlight with a clear glass cover, and the optical proxy could be an optically transmissive diffraction grating.

Figure 4A:
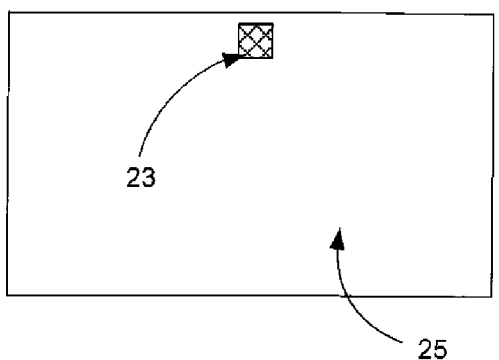
Figure 4B:
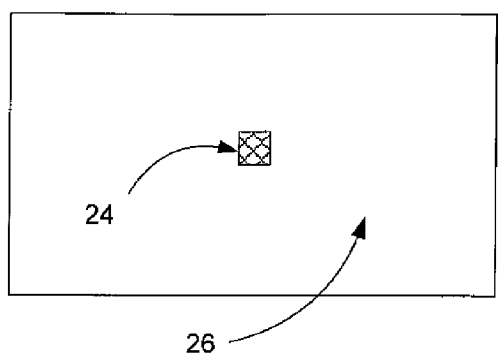
Figure 4C:
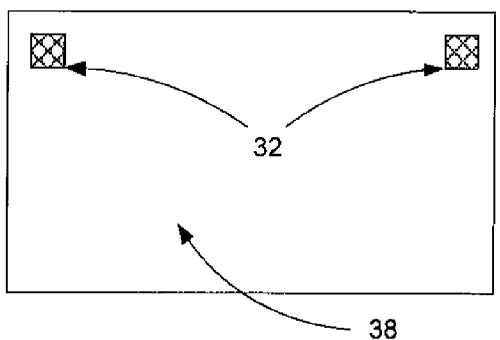

The shape of optical proxies 23 as shown in FIGS. 4A-4C is substantially square, but a variety of shapes may be used. In alternative embodiments optical proxy 23 may have a substantially rectangular shape. In yet another alternative embodiment the shape of optical proxies 23 may be substantially circular. In still another alternative embodiment the shape of optical proxies 23 may have a freeform outline. Furthermore embodiments of the present invention may include optical proxies 23 having a plurality of shapes.

While many embodiments envision the use of light redirectors that are substantially flat, such as flat mirrors, the invention can also be used with light redirectors (also referred to herein as light redirecting elements) that are curved or otherwise have more complex shapes. One skilled in the art will appreciate that applying an optical proxy intended for a flat surface to a curved surface, will result in a blurring of the optical proxy beam to some degree. When used in such systems, various alternative embodiments exist. Some embodiments provide a flat area where the optical proxy can be placed. Other embodiments compensate for the effect of the non-flat surface by adapting the surface profile of the optical proxy to compensate. A third type of embodiment makes no specific adaptation for the non-flat surface; by way of example, such an embodiment might provide compensation for the blurring in software in the imaging subsystem 11, while in another embodiment, the resulting angular measurement precision from the blurred optical proxy beam is sufficient without any compensation.

Imaging subsystem 11 is used to detect or otherwise capture optical information produced by optical proxies 23. The subsystem 11 is able to detect, sense, observe, or otherwise capture optical information including but not limited to intensity and color of light reflected, scattered, or diffracted by optical proxies 23. The optical information correlates to the aim of reflecting elements 25, and therefore can be used by a control system to aim and concentrate redirected sunlight from heliostats 9 onto focus area 7.

Imaging subsystem 11 generally includes a plurality of sensors preferably in the form of imaging devices 28. In one embodiment, each imaging device 28 is a commercially available digital camera device. In an alternative embodiment, imaging device 28 is to varying degrees a customized device, Imaging devices 28 are mechanically coupled to a support structure 30 and arranged proximal to focus area 7, for example, within 100 meters of focus area 7 in some embodiments, or even less, for example as near as 5 meters, depending on the overall design of the CSP system. Support structure 30 is mechanically coupled to tower 5 proximal to focus area 7. In another embodiment, support structure 30 is mechanically coupled to the focus area 7. In another embodiment, support structure 30 is mounted to a separate structure other than tower 5.

In some embodiments, the tracking control system used in system I may be implemented with multiple imaging subsystems 11 and/or on a plurality of towers 5 while still maintaining a single focus 7 or multiple foci (not shown). Preferably, each imaging subsystem is responsible for tracking a portion of the heliostat field 9. Such an architecture may be advantageous when some heliostats 9 are very far from the focus 7. By placing additional towers and imaging subsystems at remote locations in the heliostat field, sensing capability may be improved. The disadvantage of such an embodiment is the need for multiple towers and imaging subsystems, and the need to keep them all geometrically coordinated. In some embodiments, multiple imaging subsystems may be provided for purposes of redundancy. In such embodiments, the fields of view of the imaging subsystems may be designed to intentionally overlap.

As illustrated, imaging devices 28 are arranged about the focus 7 in a generally radially symmetric fashion. Other arrangements may be used. For example, an alternate embodiment of imaging subsystem 11 includes a plurality of imaging devices 28 that are arranged about focus 7 in a generally linear symmetric manner. In an alternative embodiment, imaging subsystem support structure 30 is substantially free standing, being independently mechanically coupled to mounting surface 21. Imaging devices 28 are sufficiently close to focus area 7 so that detected diffraction information can be used in a closed loop control system to actuate reflecting elements 25 for aiming at focus area 7. However, the devices 28 are far enough away from focus area 7 to avoid undue risk that the devices 28 would be damaged by concentrated sunlight. In preferred embodiments, imaging subsystem 11 is mechanically coupled to a central tower 5, but it may be deployed to any convenient mechanical mounting point. In some embodiments, for example, the imaging subsystem may be mounted approximately halfway up the central tower 5. In some embodiments, a separate tower may be provided.

Imaging subsystem 11 includes a plurality of imaging devices 28 having suitable field of view characteristics by which the plurality of diffractive elements 23 are observed. In one exemplary embodiment, each imaging device 28 has an effective field of view such that it can observe the entire plurality of optical proxies 23 either statically or by the use of opto-mechanical mechanisms or other actuation techniques allowing a plurality of fields of view. In an alternative embodiment individual imaging devices 28 have an effective field of view to observe a subset of the plurality of optical proxies 23 either statically or by use of optic-mechanical mechanisms allowing a plurality of fields of view. In such an embodiment the union of the plurality of fields of view includes the entire plurality of optical proxies 23. In another alternative embodiment a plurality of subsets of imaging devices 28 have effective fields of view such that their intersection and union of observable diffractive elements are equivalent with a given subset and/or the union of all effective fields of view includes the entire plurality of optical proxies 23.

Figure 2B:
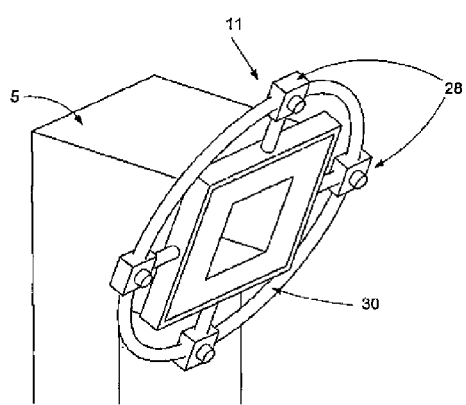
FIG. 2B is a perspective view of an exemplary imaging subsystem of the present invention applied to a concentrating solar power system.
Figure 2C:
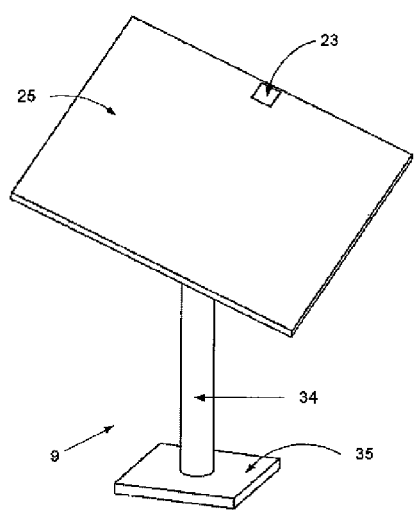
FIG. 2C is a perspective view of an exemplary heliostat with an exemplary optical proxy of the present invention.
Figure 3:
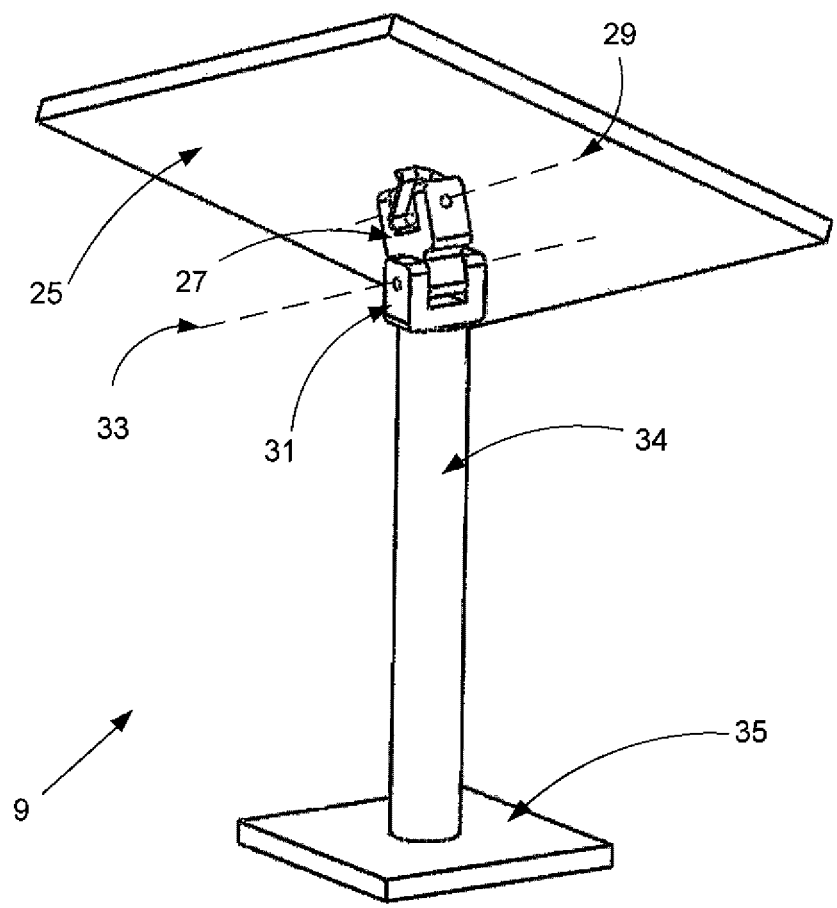
FIG. 3 is a perspective view of an exemplary heliostat.

Referring further to FIG. 2B, in some embodiments, imaging subsystem 11 is replaced by some other form of sensing system that senses some property of the optical proxy beam that can be used to help determine the direction of the chief ray 17 from the light redirecting element. By way of example, a phase-sensing system that senses time of flight of the optical proxy beam could be used.

FIGS. 4A through 4D schematically show front views of exemplary reflective elements fitted with exemplary optical proxies of the present invention. FIG. 4a shows an embodiment of a diffractive element, for example, as a kind of optical proxy 23 on reflective element 25 according to the heliostat 9 of FIG. 2c such that optical proxy 23 is substantially centered in the horizontal direction and substantially along the top edge of reflective element 25. Such location of optical proxy 23 is advantageous in concentrating solar power systems as it minimizes the risk that optical proxy 23 would be obstructed by neighboring heliostats throughout a full range of functional articulation.

FIG. 4b shows optical proxy 24 substantially close to the center of reflecting element 26. This embodiment may allow obstruction-free observation of optical proxy 24 but may impose a minimum spacing requirement on a CSP system. This embodiment may provide an advantage in minimizing the displacement of optical proxy 24 as a function of rotation of elements 26 and 24 about tip and tilt axes provided that proxy 24 is located proximal to one or more axes of rotation.

Figure 4D:
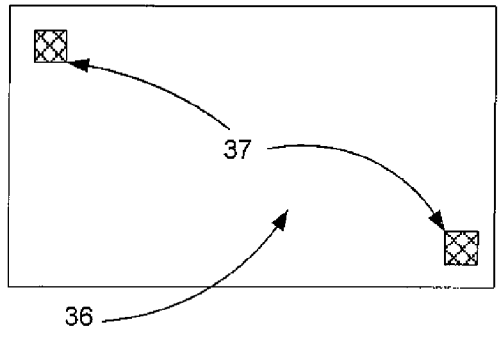

In yet another alternative embodiment of FIG. 4c, a plurality of optical proxies 32 are provided on reflective element 38. The location of optical proxies 32 are such that at least one optical proxy 32 is not obstructed over the functional articulation range. Such exemplary embodiments include locating two optical proxies 32 substantially proximal to adjacent corners of reflecting element 38. FIG. 4d shows a similar embodiment in which optical proxies 37 are positioned at opposite corners of reflecting element 36. Still yet other alternative embodiments may locate any number of optical proxies on a corresponding reflecting element.

In further embodiments, one or more optical proxies 23 are placed outside the area of reflecting element 25, but are mechanically coupled to it by a support structure. By way of example, the optical proxy could be placed in a location where it is substantially centered along the top edge of the reflecting element 25, but above the top edge of the reflecting element, advantageously not obscuring any of the area of reflecting element 25, while also avoiding obstruction from nearby heliostats.

Still yet other alternative embodiments may locate any number of optical proxies 23 on reflecting element 25 anywhere on reflective element 25.

In addition to or in combination with diffractive elements, a wide range of optical elements may be used as optical proxies in the practice of the present invention. For example, the present invention teaches that another particularly useful optical proxy is a diffuser. Compared to a diffractive element, which encodes the angular offset to the reflected chief ray as a color, a preferred diffuser tends to encode the angular offset as an intensity level, with intensity highest at low angular offsets and lowest at high angular offsets. This is represented conceptually in FIG. 26, where the length of the arrows of rays 18 is intended to indicate the relative intensity of each ray. One useful type of diffuser is a ground glass diffuser, which tends to have a function of intensity versus angular offset that is a Gaussian function, $p(\phi)=a \exp(-\phi^2/2c^2)$.

Other embodiments may include diffusers with alternative profiles. For example, so-called engineered diffusers can be designed with a wide variety of profiles. For example, profiles whose intensity varies as the inverse of the angle, $p(\phi)=f/\phi$, or as the inverse square of the angle $p(\phi)=a/\phi^2$, have the advantageous property, compared to the Gaussian diffuser, that their brightness tends to remain more constant as the diffuser is moved away from the imaging subsystem 11 thus helping to more easily enable the same diffuser to be used at a large range of distances from the imaging subsystem.

In additional embodiments, application of the superposition principle permits multiple optical elements to be "stacked" into a single composite element. This combines the functions of multiple optical elements into a common footprint. When an embodiment comprises more than one optical proxy or multiple subelements in one element, the elements may be of the same type (for example, all could be diffractive elements) or of different types (for example, some could be diffractive elements while some could be diffusive elements).

For example, FIG. 28 shows how the surface profile 301 of optical element 303 and the surface profile 305 of optical element 307 may be combined into a single surface profile 311 of a composite element 309, which then combines the functions of both elements into a single element.

In one exemplary embodiment, the superposition principle is used to combine a circular diffraction grating and an engineered diffuser with an inverse square intensity profile into a single composite optical proxy. Other embodiments may include more than two superposed profiles, and may combine any desired plurality of optical elements. Alternative embodiments superpose optics of any sort, not just of nominally planar surfaces. By way of example, a surface profile of an element may be superposed on an axicon, or on the surface of a lens, yielding a composite element. Polarizing elements are another kind of optical element suitable for use as an optical proxy.

Applicants' co-pending application 61/465,165, "Apparatus and Method for Pointing Light Sources", disclosed numerous techniques for pointing light sources using a diffractive optical element to sense the direction of a redirected light source and then reposition the optical redirector as desired to control the direction of the redirected light.

In some embodiments using diffractive elements, multiple elements may be provided that comprise several diffraction gratings with different pitches, so as to produce a multiplicity of optical proxy beams with different angular distributions. Likewise, embodiments using diffusive elements may comprise multiple diffusers to produce a multiplicity of beams with different angular distributions.

In embodiments where a diffuser is used as one or more of the optical proxies, the color of the light distributed by the diffuser is arbitrary, since the diffuser encodes angular offset as intensity rather than a color. While the most obvious choice is a colorless diffuser (which an observer would most likely identify as "white"), some embodiments may use a tinted diffuser, or alternatively may place a color filter in series with the diffuser, so that the light distributed by the diffuser is colored.

Such an embodiment can advantageously help to distinguish the diffuser from the background. For example, on a day that is partly cloudy, a white diffuser may be difficult to distinguish from background clouds which are visible in the mirror 25. Some embodiments of the invention therefore use a colored diffuser, which can be easily distinguished from the white background of clouds.

Specifically, preferred embodiments tend to use a red diffuser, since a red diffuser is also advantageously easily distinguishable from the background blue sky. Alternative embodiments may use any convenient color or combination of colors, including non-visible colors. By way of example, some embodiments may use an infrared diffuser. Such an infrared diffuser might actually appear black to the naked eye, but would be readily visible to a monochrome silicon-based imaging camera, and would be easily distinguished from clouds and from the sky.

Some embodiments apply the principle of combining different optical proxies for different purposes to the notion of diffuser color as well. For example, a red diffuser with a narrow angular intensity distribution could be used together with a green diffuser with a broad angular intensity distribution. The red diffuser would tend to have high accuracy, while the green diffuser would offer a wide detection angle, and the two would be easily differentiated by the imaging subsystem 11.

Similarly, some embodiments could vary the intensity or polarization of a diffraction grating in order to improve some property of the system. Referring to FIG. 16b, in general, an embodiment that takes advantage of one parameter of the light to encode the angular offset 215 to the chief ray 211 may use other parameters of the light as needed to perform other useful functions.

In those embodiments including diffractive elements used singly or in combination with other diffractive elements or other kinds of optical elements, a range of diffractive elements may be used in the practice of the present invention.

To understand the use of diffractive elements in the practice of the present invention, we will review the operation of linear diffraction gratings. FIG. 5 shows a linear diffraction grating 51 having regularly spaced grating lines 53. Diffraction gratings have long been used in devices such as spectrometers to split polychromatic light into its constituent colors in order to characterize the light source or the material that is reflecting/absorbing the light. There are various types of linear diffraction gratings, but in principle they generally incorporate a set of parallel grooves or lines suitably sized and spaced for diffraction, e.g., on the order of the wavelength or even 10× or more of the light band to be diffracted. The spacing of the grooves sets up constructive and destructive interference that results in light of different wavelengths constructively interfering at different angles relative to the incident light beam. Consequently white light passing through a transmission grating or reflecting off of a reflective grating will generate a spectrum of colors similar to the effect of a rainbow. The diffraction angle is a function of both the line spacing, the wavelength of the diffracted light, and the angle of incidence on the grating. The equation below gives the relationship between the diffraction angle $\theta_m$, the groove spacing d, the incidence angle $\theta_i$ and the wavelength $\lambda$. The equation has multiple solutions since the interference maxima are periodic. The integer m is the diffraction order and can be positive, negative, or 0.

$$d(\sin(\theta_m)+\sin(\theta_i))=m\lambda \qquad (1)$$

The m=0 or $0^{th}$ order diffraction is a special case and is equal to the angle of reflection in the case of a reflective grating or the angle of refraction in the case of a transmission grating.

FIG. 6A shows reflective linear diffraction grating 51 of FIG. 5 viewed on edge and being illuminated with a single polychromatic ray of light 55 that impinges on the diffraction grating 51 perpendicular to its plane. The grating reflects the light into ray 57 and also diffracts the light into multiple diffractive orders 59 through 65. Each diffractive order is represented schematically by three monochromatic light rays. Angle 67 represents the angle between the $0^{th}$ order reflected light ray 57 and the $1^{st}$ order diffracted ray 59. From the above equation we see that angle 67 is independent of the angle of incidence. This means that detection of any of rays 59 through 65 provides information concerning the location of reflected ray 57.

FIG. 6B shows incident ray 55 impinging on grating 51 of FIG. 5 at non-normal incidence. The reflected $0^{th}$ order ray 57 reflects from grating 51 at an angle that is equal to the angle of incidence of ray 55. The $1^{st}$ order diffracted rays 59 maintains the same angular separation 67 relative to the $0^{th}$ order reflected ray as does the $-1^{st}$ order rays 61 regardless of the angle of incidence of ray 55. The same is true for higher order diffracted rays 63 and 65.

Referring to FIGS. 6A and 6B, one skilled in the art will appreciate that a ray of light diffracted from a linear grating 51 is dispersed in one dimension only, into a narrow plane. In the case of a light source like the sun that is less than ½ degree in size, the dispersed light will be confined to a narrow ½-degree region of space.

Further consideration of this result illustrates that a linear diffraction grating although useful is less than optimum to serve as a more preferred diffraction element 23 of the present invention, since the diffracted light is not observable by an imaging detector 28 unless it happens to lie in that narrow ½-degree region of space, and can be readily detected by more than one of the detectors 28 in only the most fortuitous of circumstances. Further, as the sun moves through the sky during the day and light redirecting element 25 changes angles, this ½-degree region of space moves widely across the sky, often far from imaging system 11.

To solve this problem, more preferred diffraction-based embodiments of the present invention introduce using a diffraction element that has structure in two dimensions, that can thus broadcast light broadly into three dimensions, so that a large two-dimensional area proximal to target 7, including at least the area including imaging detectors 28, is illuminated by the broadcast light.

The present invention teaches that preferred embodiments of diffractive elements incorporate a circular or spiral grating. For example, FIG. 7a shows diffractive element 91 having a circular grating formed from concentric rings 93. FIG. 7b shows diffractive element 94 having spiral grating 95. Other, less preferred, embodiments may use superposed and/or an array of linear gratings that increase the window for observing diffraction effects as compared to a further less preferred embodiment, wherein only a single linear grating is used.

While standard linear gratings can be used by the present invention, individual linear gratings provide more limited utility compared to 2-D gratings. By way of example, when used to sense pointing of the sun, in the non-dispersing direction, a single linear grating broadcasts light over only a very narrow angle of slightly less than ½ degree (the width of the sun.) Two linear gratings may be provided, oriented ½-degree differently from one another, to provide a 1-degree broadcast angle. Similarly, four linear gratings may be provided to provide a 2-degree broadcast angle, and so on.

Since many practical applications require broadcast angles of 90 to 360 degrees, a large number of linear gratings may be required to provide a sufficient broadcast angle. For this reason, two-dimensional gratings such as circular or spiral are preferred by the present invention.

Advantageously, circular and spiral gratings effectively provide a continuous set of linear gratings about their center point. This is schematically shown in FIG. 7c. Consider narrow portion 97 of diffractive element 91 (FIG. 7a). This portion 97 approximates a linear grating with horizontal lines and thereby will generate a diffraction spectrum when illuminated by light orthogonal to the horizontal axis 105. Likewise, portions 99,101, and 103, respectively, approximate linear diffraction gratings having diffractive axes 102, 104, and 108 orthogonal to the angle of the cross section, respectively. In the limit that the width of the cross-section goes to zero, there are an infinite number of linear diffraction gratings having diffraction axes completely filling 0° to 360°. The same benefits are provided by circular and spiral gratings. Advantageously, circular or spiral gratings overcome the problems of non-linear effects encountered with linear gratings and are more preferred.

A single circular or spiral grating, however, does have a disadvantage that the width of the observed spectrum is confined to a narrow line proportional to the angular width of the illuminating source. Consequently such gratings may require a higher resolution imaging subsystem than might be desired in order to observe diffraction spectra of all diffractive elements in the tracking control system 1. Accordingly, to overcome resolution limitations of single circular or spiral gratings, alternative embodiments of more preferred diffractive elements preferably include a plurality of circular or spiral gratings arranged in a two dimensional array. For example, referring to, FIG. 8a, diffractive element 112 includes a plurality of circular or spiral grating sub-elements 115. Each sub-element 115 is capable of diffracting incident light in all diffractive axes that when viewed from a relatively close view point can be resolved as a set of parallel spectra 117 as shown in FIG. 8B, e.g., one spectrum for each sub-element 115 in FIG. 8a. When viewed from relatively far away, the set of parallel spectra 117 of FIG. 8B are resolved as a single spectrum.

Some aforementioned embodiments describe diffractive elements including sub-elements having uniformly spaced diffraction lines. Alternative embodiments may include sub-elements having non-uniformly spaced diffraction lines. Likewise alternative embodiments may include a plurality of sub-elements having diffraction lines arranged so that respective lines are parallel but having different spacing. Diffractive elements including sub-elements with a plurality of line spacings advantageously allow diffractive elements to provide greater dynamic range by tuning the diffractive orders to overlap.

A single optical proxy may comprise a plurality of individual optical elements. In some embodiments comprising a plurality of elements of different types, the elements can be optimized for different purposes. In one embodiment, for example, multiple diffractive elements can be provided which diffract light into different angles, resulting in a broader dispersion of light, increasing the angular range over which the reflecting element 25 and its optical proxy can articulate while still being easily detected by the imaging subsystem 11. In another embodiment, multiple diffusive elements could be provided for a similar reason. In another embodiment, both diffractive and diffusive elements could be provided. An embodiment of this type could have advantages in terms of robustness; for example, the diffusive element might have an intrinsically wide broadcast angle, but its accuracy could be adversely affected by the additionally diffusive effects of morning dew, while the diffractive element might have a narrow broadcast angle but the accuracy of its wavelength dispersion would be unaffected by dew.

Embodiments may comprise a plurality of optical proxies that may comprise any number of different elements, including but not limited to diffraction gratings or other diffractive elements, axicons, diffusers, polarizers, and combinations of these. In some modes of practice a portion of these may be diffusive elements, a portion may be diffraction elements, a portion may be polarizing elements, or the like. Optical proxies may include any number of optical elements arrayed in any convenient shape.

Other embodiments of optical proxies use sheets incorporating optically functional layers. These sheets may be made using roll-to-roll manufacturing or using techniques similar to those used to make holographic stickers. Optically functional layers can provide a desired optical effect, e.g., diffraction, diffusion, polarization, or combinations of these. The sheets may be single layers or a laminate of two or more layers. In particular, holographic sticker manufacturing techniques may generate specific dot matrix patterns for a high level of control of the diffractive properties that approximate the effect of linear and circular gratings described herein. Advantageously, holographic sticker manufacturing techniques advantageously provide a low cost method to manufacture high volumes of optically active elements, as evidenced by the readily available low cost holographic stickers commonly used for security and authentication purposes on consumer goods and packaging.

To illustrate this, FIGS. 9A through 9C schematically show another embodiment of an optical proxy 106 that includes a plurality of layers including a diffractive layer 107. Optically functional layer 107 is in the form of an embossed or otherwise fabricated sheet (including a laminated sheet) incorporating one or more optical functions. Desirably, the sheet in some modes of practice has been manufactured using techniques similar to those used to fabricate holographic stickers. Optical proxy 106 further includes an adhesive layer 109. Optically functional layer 107 provides any of the aforementioned optical properties whereas adhesive layer 109 provides a mechanism by which to mechanically couple optical proxy 106 to a reflective element or associated structure. Optical proxy 106 may include a removable backing layer 111 that prevents diffractive element 106 from prematurely adhering to other entities. This advantageously allows optical proxy 106 to be manufactured in volume, stored, and handled efficiently prior to the removal of backing layer 111 and coupling to a reflective element during assembly. Optionally, optical proxy 106 may include a UV resistant layer 113 applied over optically functional layer 107 that increases the lifetime of optical proxy 106 when exposed to UV doses as in the case of outdoor sun exposure. As another option, the optically functional layer 107 itself may include UV resistant components such as dyes that improve the lifetime under outdoor sun exposure. Furthermore, optical proxy 106 may include additional layers that provide additional diffractive layers, and/or mechanical advantages such as stiffness to improve repeatability during the manufacturing or assembly processes.

FIGS. 10a and 10b show an exemplary imaging device 120 suitable in the practice of the present invention. Imaging device 120 includes a mechanical housing 121, lens housing 123, and electronic interconnect 125. Mechanical housing 121 provides general structural support and environmental protection of imaging electronics 129. Likewise lens housing 123 positions and protects one or more lenses 127. Imaging electronics 129 includes a focal plane array 131 onto which lenses 127 image objects within the field of view imaging device 120.

In one embodiment, imaging device 120 is a commercially available digital camera device. In an alternative embodiment, imaging device 120 is to varying degrees a customized device. In embodiments where the color of the light is used to encode the angular offset, it is desirable that the imaging device 120 be a color digital camera device. Other embodiments may require likewise specialized optics. By way of example, an embodiment that used polarization to encode the angular offset would tend to include polarization-manipulating optical elements as part of the imaging device 120.

Imaging device 120 preferably includes enough bits of resolution to distinguish the smallest change in angular offset that the system is required to detect. By way of example, in a CSP system, it may be desirable to sense the angular offset of the reflected sunlight to an accuracy of 1 milliradian or better. With an optical proxy that is a diffuser, a 12-bit or 16-bit monochrome camera may be preferred, while with an optical proxy that is a diffraction grating, a 24-bit color camera may be preferred.

Likewise, imaging device 120 must also provide sufficient spatial resolution to adequately sense optical proxies included inside its respective field or fields of view. Spatial resolution of imaging device 120 is affected by the number of pixels provided by the plurality of focal plane arrays 131, and optical properties of lenses 127. Whether a given optical proxy can be sufficiently resolved depends on these factors, as well as the physical dimensions of optical proxy, the position of the optical proxy within the field of view, and the distance between the optical proxy and imaging device 120. For a given optical proxy within the effective field of view of imaging device 120, the minimum spatial resolution is preferably such that optical proxy 120 can resolve to at least a single pixel in the image space of imaging device 120. Because the orientation of optical proxy relative to imaging device 120 is not fixed but can vary within the range of its associated articulation mechanism, the size of optical proxy in the image space of imaging device 120 is not fixed but is rather a function of the orientation of optical proxy. Consequently, the spatial resolution of imaging device 120 preferably is sufficient to resolve the optical proxy to a minimum of a single pixel in image space over the full range of orientation of the optical proxy.

In one embodiment the spatial resolution of imaging device 28 is such that for each optical proxy 23 included in the effective field of view the minimum respective size in image space is a single pixel over the range of articulation orientations. Such an embodiment advantageously minimizes the required resolution of imaging device 28 and consequently the cost of the device as cost is generally directly proportional to spatial resolution.

In an alternative embodiment, the spatial resolution of imaging device 120 is such that for each optical proxy included in the effective field of view the minimum respective size in image space is an n x m array of pixels over the range of articulation orientations where n and m are integers where at least one is greater than or equal to 1. Such an embodiment does not necessarily minimize the spatial resolution of imaging device 120, however, it advantageously provides a resolution margin. Additionally such embodiments enable imaging device 120 to be deployed in tracking control systems 1 having varying topologies and numbers of optical proxies 120 within its effective field of view.

Numerous configurations of imaging device 120 are possible in different embodiments. In one embodiment, a plurality of focal plane detectors 131 are provided, with each detector being a 2-D array sensor, such as a typical digital camera CCD or CMOS sensor.

In alternative embodiments, a line scan (1-dimensional) detector is provided, together with a scanning mirror, such as is present in a typical photocopier or desktop scanner. Such a detector advantageously may provide very high resolution, at the expense of frame rate and the addition of a moving part.

Further embodiments combine a plurality of 2-D detectors and line scan detectors.

Because the apparent size of an object in an image is dependent on the distance to the object, one can see that the nominal mapping of the heliostat field onto the focal plane 131 of imaging device 120 varies as the distance to the heliostats 9 varies. Heliostats that are far away occupy relatively few pixels, while heliostats that are close occupy a large number of pixels.

In order to make more effective use of the sensor, some embodiments provide a field compression optic in front of or as part of lens 127. This field compression lens provides a variable magnification of the heliostat field, so that heliostats that are closer are less magnified, while heliostats that are farther away are more magnified, thus making better use of the pixels of detector 131, permitting larger heliostat fields to be imaged with the imaging device 120.

One particularly useful embodiment of a field compression optic is a lens that provides for distortion of the vertical axis only, since resolution on the vertical axis tends to be the limiting constraint on heliostat field size in some embodiments. The field distortion optic may be a mirror or lens or any convenient optical component.

FIG. 11 shows how imaging subsystem 11 shown in FIGS. 2A and 2B may be incorporated into a tracking control system 150 of the present invention. The tracking control system 150 includes imaging subsystem 11, computation subsystem 151, and a plurality of articulation subsystems 153. Imaging subsystem is electronically coupled to computation subsystem 151 via interconnect 155 by which computation subsystem 151 acquires image data. Computation subsystem 151 is likewise electronically coupled to a plurality of articulation subsystems 153 via interconnects 157 by which computation subsystem 151 delivers pointing instructions to and receives status telemetry from articulation subsystems 153. Electronic interconnects 155 and 157 may be realized by wired and/or wireless communication topologies. The articulation subsystems 153 actuate corresponding heliostats (not shown) to aim redirected light at a desired target. Electronic interconnects 155 and 157 may be realized by wired and/or wireless communication topologies. In some preferred embodiments, the wireless communications system is a Zigbee mesh network.

FIGS. 12a and 12b show illustrative embodiments of imaging subsystem 11. Referring to FIG. 12a, imaging subsystem 11 includes a plurality of imaging devices 152 connected independently or through a common electronic bus 155 to computation subsystem 151 (shown in FIG. 11). In an alternative embodiment of FIG. 12b, imaging subsystem 11 further includes image processing controller 159 coupled electronically to a plurality of imaging devices 152 via a plurality of interconnects 161. Interconnects 161 include wired and/or wireless communication topologies. Image processing controller 159 provides localized coordination of one or more of the following functions that include image acquisition, image pre-processing, and image transmission to computation subsystem 151 (FIG. 11) via interconnect 155.

FIGS. 13a and 13b show illustrative embodiments of articulation subsystem 153.

Referring to FIG. 13a, articulation subsystem 153 includes an articulation processor 163 electrically coupled to articulation mechanism 167 via interconnect 165. Mechanism 167 is mechanically coupled to a diffractive element (not shown). Articulation processor 163 receives pointing instructions from computation subsystem 151 (FIG. 11) via interconnect 157 to effect articulation of articulation mechanism 167 and the corresponding diffractive element. In an alternative embodiment shown in FIG. 13b, articulation processor 163 is electrically coupled to a plurality of articulation mechanisms 167 via a plurality of interconnects 165. Interconnects 165 may be distinct interconnects or be combined in one or more bus topologies.

FIG. 14a shows an embodiment of computation system 151 (FIG. 11) in more detail.

Computation subsystem 151 includes a plurality of parallel processors 169. Parallel processors 169 are electrically coupled to imaging subsystem 11 via interconnect 155 and to a plurality of articulation subsystems 155 via interconnect 157. In some embodiments parallel processors 169 are coupled so that the interconnect 155 and interconnect 157 are distinct logical and/or physical buses. In alternative embodiments such as shown in FIG. 14b, interconnect 155 and 157 are combined into a single logical and/or physical bus.

FIG. 15 shows an alternative embodiment of computation system 151 (FIG. 11) in more detail. Computation subsystem 151 includes a master processor 171 and a plurality of slave processors 173 and 179 electrically coupled via interconnect 177. Master processor 171 provides supervisory control over the plurality of slave processors 173 and 179, including but not limited to timing and external diagnostic interfacing. Slave processors 179 provide image acquisition and processing via interconnect 155, whereas slave processors 173 provide articulation control via interconnects 157.

The optical properties of optical proxies according to the present invention advantageously provide a method whereby imaging subsystem 11 (FIG. 11) in conjunction with a computation subsystem 151 (FIG. 11) is able to use observed optical information produced by optical proxies to sense and determine the angular displacement of the main reflected beam relative to the observation point. For purposes of illustration, FIGS. 16a through 16c illustrate this schematically with respect to CSP system 1 of FIGS. 2a-2c and 3 in which the optical proxy includes diffraction functionality. Similar principles apply where the optical proxy uses other optical functionality.

The goal of the imaging subsystem is to infer the direction of the chief reflected ray 211 from the images recorded by imaging devices 28. An initial step toward achievement of this goal is to consider the nature of the images recorded by a single imaging device 28.

The optical properties of optical proxy 23 advantageously provide a method whereby imaging subsystem 11 in conjunction with computation subsystem 151 is able to use an observed property of the light to sense the angular offset 215 of the reflected chief ray 211 relative to the observation point at imaging device 28. Referring to FIG. 16, optical proxy 23 is illuminated by a light source such that the rays 201 that hit optical proxy 23 are substantially parallel. Imaging device 28 receives light distributed by optical proxy 23 through its lens aperture 55. The collected ray bundles represented by the edge rays 203 are focused by the imaging device onto a focal plane array 131. The focused ray bundle is represented by edge rays 205. The resulting image 219 contains the sub image 225 of the optical proxy 23. In the case where imaging device 28 is substantially far away from optical proxy 23 relative to the size of the optical proxy 23, the angular extent of collected rays 203 is relatively small. Under these conditions we approximate the optical beams using just the central rays.

Source ray 207 impinges on optical proxy 23. The reflected ray 211 makes an angular offset 215 relative to ray 209 of the optical proxy beam. Ray 209, as such is observed by imaging device 28, makes an angle 215 relative to the chief reflected ray 211. Angle 213 represents the nominal angular position of optical proxy 23 in imaging device's 28 field of view. Exemplary image 219 acquired by imaging device 28 has sub-image 225 that is the mapping of the optical proxy 23 into image space. The location of optical proxy 23 in image space represented by sub-image 225 is given by horizontal coordinate 221 and vertical coordinate 223. Due to the optical effects of optical proxy 23; the color, intensity, or some other property of sub-image 225 is a function of angle 215.

The optical properties of sub-image 225 provide information about the possible magnitude of angle 215. Referring to FIG. 17, one of the imaging devices 28 in imaging subsystem 11 observes optical proxy 23 illuminated by a substantially collimated light source. Given the specific optical properties of the optical proxy 23 and the observed sub-image 255, the angle between the camera—element line of site 231 and the main reflected ray 209, θ m, is constrained to be a member of a set of angles corresponding to the value of the property of the light measured by imaging subsystem 28 in sub-image 255. By way of example, if a diffractive sensor is used, sub-image 255 will measure the color of ray 209. Two such possible angles θ-1 233 and θ-2 235 are shown and correspond to exemplary reflected rays 237 and 239 respectively. Note that these angles and orders are exemplary and do not represent the full set of possible angles that can be measured by the observed sub-image 255.

With information from one single imaging device 28, when attempting to use the information from sub-image 255 to infer the direction of main reflected ray 211, there are in fact an infinite number of possible reflected ray vectors that lie along the surface of a cone with vertex angle 2θ m. The set of cones share a common axis coincident with the line of site vector 231. The cones are represented by their circular bases 241 and 243 for the angles 233 and 235 respectively.

For completeness, given the set of possible reflection vectors for the observed properties of the light in sub-image 255, using well known laws of reflection, the set of possible incident light vectors can be determined. The set of all possible incident light vectors lie along the set of cones having a common axis 236, which is the reflection (off optical proxy 23) of the line of sight 231 of imaging device 28, and having vertex angles 245 and 247. These cones are represented by their circular bases 249 and 251 in the exemplary solution. By the laws of reflection, angle 245 equals angle 233, and angle 247 equals angle 235. Thus, the observed optical proxy information allows candidate vector locations of reflected light to be propagated backwards to determine candidate incident light vectors. The set of candidate solutions generally form cones with an apex at the optical proxy 23, main axes 236 which is the reflection of imaging device line of sight 231, and cone apex angles that can be determined from the observed optical proxy information.

Whereas the image of an optical proxy 23 from a single viewpoint such as provided by a single imaging device 28 can partially constrain the solution for the orientation of the main reflected ray 211, multiple viewpoints from multiple imaging devices 28 can provide more specific information to fully constrain the solution to a single vector.

In particular, a two viewpoint embodiment provides sufficient information by which to constrain reflected ray orientation to at most two possible vectors and in some limited cases, can uniquely constrain the reflected ray orientation. Referring to FIG. 18, an optical proxy 23 is represented as point 261 having a normal vector 265 lying in plane 285. Imaging devices 28 have viewpoints represented by points 269 and 271 that lie on plane 285. Light ray 273 is incident on point 261 of optical proxy 23 and lies along plane 285. Main reflected ray 275 also lies along plane 285 and intersects plane 287 at point 267. Lines of sight 277 and 279 form angular offsets with the reflected ray 275 resulting in a unique value for the optical property of interest of optical proxy 23, at each of the two viewpoints 269 and 271. Circles 281 and 283 represent the locus of possible reflected rays that would result in the optical property of optical proxy 23 that is observed at viewpoints 267 and 271 respectively. The intersection of 281 and 283 is a single point 267 which is in fact the unique solution to the two viewpoint observation.

Referring to FIG. 19 a similar two viewpoint constraint is demonstrated in which incident ray 273 reflects off of optical proxy 23 at point 261 such that reflected ray 275 intersects plane 287 at point 267. In this example the location of intersection is such that it is not located between viewpoints 269 and 271. In this instance the locus of possible rays represented by circle 283 for viewpoint 271 is encircled by locus of possible rays 281 for viewpoint 269 and has a single intersection point 267 which is the unique solution for reflected ray 275 give the observed optical properties of optical proxy 23. It has been determined that for any reflected ray 275 lying along plane 285 results in a locus of possible points relative to viewpoints 269 and 271 that have a single intersection 267.

In cases, however, that the plane of incidence is not coplanar with plane 285 a unique locus intersection does not exist. Referring to FIG. 20, incident ray 273 and reflected ray 275 lie along plane 291 that is not coplanar with plane 285. Resulting possible main ray loci 281 and 283 for viewpoints 269 and 271 respectively intersect at point 267 which lies along reflected ray 275. In addition loci 281 and 283 have a secondary intersection at point 293. This intersection represents an alternative reflected ray that would result in the same set of observed optical properties from the two viewpoints 269 and 271. Consequently, observation of optical proxy 23 from two viewpoints alone does not provide unique determination of the reflected ray vector. In some possible embodiments, existence of certain constraints may provide sufficient knowledge to overcome the aforementioned ambiguity associated with the two viewpoint observation. One such constraint includes constraints on the location of the light source. In particular, in the case of a concentrating solar power system, it is possible that one of the two possible solutions is not feasible because it would imply a sun position that is below the horizon. In alternate applications various other constraints may be used to resolve which of the two possible solutions is correct.

Another approach to resolve the possible ambiguity with the two viewpoint observation is a step and observe method. This method uses multiple observations as a function of orientation of optical proxy 23 to determine which of the two solutions describes the real reflected ray.

Yet another approach to overcome ambiguity present in the two viewpoint observation is the addition of a third viewpoint. Referring to FIG. 21, third viewpoint 295 having line of sight 297 to point 261 on optical proxy 23 and lying in plane 287 observes an optical property from the optical proxy that is a function of the angular offset between line of sight 297 and reflected ray 275. The locus of possible main rays for viewpoint 295 is represented by circle 299. Points 293 represent the set of intersections between exactly two loci circles. Point 267 represents the unique intersection of all three loci circles 281, 283, and 299. Consequently, observation from three distinct viewpoints 269, 271, and 295 provides a unique determination of reflected ray vector 275.

Whereas three distinct viewpoints are sufficient to uniquely determine the orientation of reflected ray vectors originating from a known point in space, in general four or more distinct viewpoints may be utilized. In such embodiments, viewpoints in excess of three may provide redundancy, or may provide information as to the accuracy of the solution for the reflected chief ray.

In addition to observed primary optical property of optical proxy 23 from a plurality of viewpoints, other properties of the observed light provide information that may be useful in determining the orientation of the reflected ray. In particular, relative intensity is useful for determining whether two or more viewpoint observations correspond to the same or different diffraction orders, when a diffractive optical proxy is used.

The preceding sections detail how observations of an optical proxy 23 from three or more distinct viewpoints provide a unique characterization of the orientation of reflected ray 275. The relationship can be represented by equation 2:

$$C_i = A_i \cdot R_i \quad (2)$$

Where $C_i$ is a vector having an element corresponding to the optical property observed from the $i^{th}$ optical proxy 23, $R_i$ is a unit vector corresponding to the orientation of reflected ray 275 for the $i^{th}$ optical proxy 23 relative to a known reference coordinate space, and $A_i$ is a transformation matrix that maps the reflected ray unit vector into the observed property vector for the $i^{th}$ optical proxy 23. Given an observation from three or more viewpoints and transformation $A_i$ it is possible to determine the orientation of the reflected ray by using the inverse of equation 2:

$$R_i = A_i^{-1} \cdot C_i \quad (3)$$

Furthermore, referring to FIG. 22, in a typical mode of practice such as with respect to CSP system 1 of FIGS. 2A-2C and 3, it is desirable that light redirecting elements 25 be oriented in such a manner such that reflected rays 305 from each light redirecting element 25 resulting from incident rays 303 substantially intersect a known point in space, referred to herein as the nominal target 301 of the light redirecting elements 25 when these are aimed as desired to concentrate sunlight. In FIGS. 2A-2C, this corresponds to the focus area 7. Consequently, for each light redirecting element 25, there is a vector that describes the desired orientation of the reflected ray 305 from a light redirecting element 25 to the nominal target 301. FIG. 22 shows a single nominal target 301 for the entire plurality of light redirecting elements 25, and this nominal target 301 preferably is substantially fixed in position relative to the control system.

Referring to FIG. 23, in an alternative embodiment, there may be a plurality of nominal targets 301. In such alternative embodiments each nominal target 301 may be associated with a subset of the plurality of light redirecting elements 25.

Referring to FIG. 24, in another alternative embodiment, the nominal target 301 is substantially fixed for a period of time and then moved to another location 309 for another period of time. After the target is shifted to location 309, new aiming vectors 307 result. The number of fixed locations and the duration of respective periods are not constrained. In yet another alternative embodiment the location of the nominal target is a substantially continuous function of time.

In illustrative modes of practice, at a given instant in time there is a substantially fixed nominal track point associated with a single optical proxy 23 from which a desired reflected ray vector $r_{i,0}$ can be determined such that reflected rays generally intersect the nominal target 301. Consequently according to equation 2 there is an observation vector $c_{i,0}$ that represents this desired reflected ray vector. Given an observation $c_{i,j}$ that corresponds to the multi-viewpoint observation of the $i^{th}$ optical proxy 23 at a known orientation represented by a unit normal vector $n_{i,j}$ the value of the unit normal is a function of the orientation of the articulation mechanism associated with the optical proxy. Mathematically, the unit normal of optical proxy 23 can be described by the following vector equation:

$$N_i = B \cdot X_i \quad (4)$$

Where $N_i$ is the unit normal of the $i^{th}$ optical proxy, $X_i$ is a vector describing the quantities of each degree of freedom of articulation mechanism, and B is the transformation matrix that maps articulation coordinates into the optical proxy unit normal.

An exemplary method of performing closed loop tracking of a plurality of articulating optical proxies in order that the reflected rays substantially intersect a known location includes the following steps desirably implemented for every optical proxy and light redirecting element within the scope of the control system. Procedure 1 is as follows:

1. Sample the observation vector $C_i$ including as vector elements the observed value of the optical property of the optical proxy of interest from a plurality of distinct viewpoints.
2. Compute the difference between the observed vector $C_i$ and the nominal on-target vector $C_{i0}$ herein referred to as $\Delta C_i$.
3. Compute articulation compensation vector $\Delta X_i$ such that $\lim_{\Delta C_i \to 0} \Delta X_i = 0$
4. Apply $\Delta X_i$ to articulation mechanism.
5. Repeat steps 1-4

An alternative method of performing closed loop tracking of a plurality of articulating optical proxies in order that the reflected rays substantially intersect a known location includes the following steps for every optical proxy according to Procedure 2:

1. Compute open loop articulation coordinate $X_i$ based on geospatial coordinates, local date and time, and position relative to the target position.
2. Apply open loop articulation coordinate $X_i$ to articulation mechanism.
3. Sample the observation vector $C_i$ including as vector elements the observed value of the optical property of the optical proxy of interest from a plurality of distinct viewpoints.
4. Compute the difference between the observed vector $C_i$ and the nominal on-target vector $C_{i0}$ herein referred to as $\Delta C_i$.
5. Compute articulation compensation vector $\Delta X_i$ such that $\lim_{\Delta C_i \to 0} \Delta X_i = 0$
6. Apply $\Delta X_i$ to articulation mechanism.
7. Repeat steps 1-6

Yet another alternative method includes the following steps according to Procedure 3:

1. Generate a lookup table of articulation coordinates $X_i[t]$ where t is the local time of day such that $X_i[t]$ is the last known substantially on target articulation coordinate at time t.
2. Interpolate $X_i$ coordinate for the current time based on lookup table.
3. Apply interpolated $X_i$ coordinate for the current time based on lookup table.
4. Sample the vector $C_i$ including as vector elements the observed value of the optical property of the optical proxy of interest from a plurality of distinct viewpoints.
5. Compute the difference between the observed vector $C_i$ and the nominal on-target vector $C_{i0}$ herein referred to as $\Delta C_i$.
6. Compute articulation compensation vector $\Delta X_i$ such that $\lim_{\Delta C_i \to 0} \Delta X_i = 0$
7. Apply $\Delta X_i$ to articulation mechanism.
8. Repeat steps 2-6.

In illustrative modes of practice, any of Procedures 1 to 3 is used in a CSP system in which a plurality of heliostats concentrate sunlight onto one or more targets. The heliostats include light redirecting elements that allow sunlight to be redirected. The light redirecting elements are mechanically coupled to articulation mechanisms allowing controlled articulation of the light redirecting elements. Corresponding optical proxies are coupled to the light redirecting elements so that optical information produced by the optical proxies is indicative of how the light redirecting elements are aimed. The system includes an imaging subsystem comprising one or more imaging devices in a position effective to observe optical information produced by the optical proxies that is indicative of the aim of the corresponding light redirecting elements. Preferably, the imaging devices are mechanically coupled to a support structure and are arranged proximal to the one or more targets. A computational subsystem including one or more computational devices is operationally coupled to the imaging devices so that the optical information captured by the imaging devices can be used to controllably aim the light redirecting elements at the desired target(s).

Many optical proxies provide optical proxy beams that are analog in nature—the property of interest varies smoothly with angle, or that is to say, the derivative of the property of interest is continuous. However, some embodiments comprise optical proxies that provide for digital encoding of the angular separation from the chief ray 211 of the redirected beam. Referring to FIG. 25, one simple embodiment would be a holographic optical proxy 323 that projects a checkerboard pattern 325 across the sky. The imaging subsystem 11, when viewing such a proxy, will observe that the proxy appears to flash as its light redirecting element moves. In one such embodiment, the control system can count the flashes and infer the angular motion of the proxy as a digital number. A more practical embodiment would include a pair of offset checkerboard proxies, enabling quadrature detection of the angular motion of the light redirector.

Other embodiments of digital encoding project a bar code, QR code, or other digitally encoded holographic image towards the imaging sensor, allowing immediate inference of the absolute angle 215 between the detected ray from the optical proxy beam 209 and the chief ray 211 of the redirected beam.

Some of these digital optical proxy embodiments encode the digital value in one complex hologram, while other embodiments can use several simpler holograms to do so.

One skilled in the art will appreciate that many embodiments using holographic digital encoding will use a narrow-band optical filter to improve the spatial resolution of the hologram, to help reduce the blurring that can occur when using a hologram with a broadband light source.

The complete disclosures of the patents, patent documents, technical articles, and other publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of aiming sunlight from a light redirecting element onto a centralized remote target, comprising the steps of:
   a) using the light redirecting element articulable about two degrees of rotational freedom to redirect the sunlight as a redirected light beam;
   b) using an optical proxy functional over a continuous range of angles in the two degrees of rotational freedom on the light redirecting element to optically modify and broadcast a portion of the sunlight as optical proxy light that encodes optical information of the redirected light beam in a modified property of the optical proxy light that is indicative of the aim of, and that is used to effect an actuation of, the light redirecting element and the redirected light beam;
   c) observing the optical information of the optically modified and broadcast optical proxy light from at least one observation point proximal to the centralized remote target;
   d) using the optical information of the observed, optically modified and broadcast optical proxy light to determine information that is indicative of the aim of the redirected light beam; and
   e) controllably actuating the light redirecting element with respect to the two degrees of rotational freedom in a manner that aims the redirected light beam onto the centralized remote target.

2. The method of claim 1, further comprising:
   f) using a second light redirecting element articulable about the two degrees of rotational freedom to redirect the sunlight as a second redirected light beam;
   g) using a second optical proxy functional over a second continuous range of angles in the two degrees of rotational freedom on the second light redirecting element to optically modify and broadcast a portion of the sunlight as second optical proxy light that encodes optical information of the second redirected light beam in a modified property of the second optical proxy light that is indicative of the aim of, and that is used to effect an actuation of, the second light redirecting element and the second redirected light beam;
   h) observing the optical information of the optically modified and broadcast second optical proxy light from the at least one observation point proximal to the centralized remote target;
   i) using the optical information of the observed, optically modified and broadcast second optical proxy light to determine information that is indicative of the aim of the second redirected light beam; and
   j) controllably actuating the second light redirecting element with respect to the two degrees of rotational freedom in a manner that aims the second redirected light beam onto the centralized remote target.

3. The method of claim 1, wherein the light redirecting element has a reflecting surface and the optical proxy is coupled to the reflecting surface.

4. The method of claim 3, wherein the optical proxy is integral with the light redirecting element.

5. The method of claim 1, wherein the optical proxy comprises a plurality of optical sub-elements.

6. The method of claim 1, wherein the optical proxy comprises a plurality of superposed optical proxies.

7. The method of claim 1, wherein the optical proxy comprises optical diffusing functionality.

8. The method of claim 7, wherein the light redirecting element further comprises at least one optical proxy comprising diffraction functionality.

9. The method of claim 1, wherein an imaging device is positioned at the at least one observation point, said imaging device having a field of view that includes the optical proxy, and wherein step (c) comprises using the imaging device to observe the optical proxy light in a way such that an optical characteristic of the observed optical proxy light is used in step (e) to controllably actuate the light redirecting element so that the light redirecting element redirects the redirected light beam onto the centralized remote target.

10. The method of claim 9, wherein the field of view includes a plurality of light redirecting elements, and wherein step (c) comprises using the imaging device to observe optical proxy light of a plurality of optical proxies on the plurality of light redirecting elements in a way such that optical characteristics of the observed optical proxy light is used in step (e) to controllably actuate the corresponding light redirecting elements so that the light redirecting elements redirect and aim sunlight onto the centralized remote target.

11. The method of claim 1, wherein the centralized remote target is on a tower and a structure is mounted to the tower, and a plurality of imaging devices corresponding to an observation point of the at least one observation point are mounted to the structure, and wherein step (c) comprises using the plurality of imaging devices to observe optical proxy light of a plurality of optical proxies on a plurality of light redirecting elements in a way such that optical characteristics of the observed optical proxy light is used in step (e) to controllably actuate the corresponding light redirecting elements so that the light redirecting elements redirect and aim sunlight onto the centralized remote target.

12. The method of claim 10, wherein step (c) comprises using a color characteristic of the observed optical proxy light to controllably actuate in step (e) the corresponding light redirecting element.

13. The method of claim 10, wherein the optical proxy comprises optical diffusing functionality and step (c) comprises using an intensity characteristic of the observed optical proxy light to controllably actuate in step (e) the corresponding light redirecting element.

14. The method of claim 1, wherein step (c) comprises using at least three observation points to controllably actuate in step (e) the light redirecting element.

15. The method of claim 1, wherein step (c) comprises using a closed loop control system to controllably actuate in step (e) the light redirecting element.

16. The method of claim 10, wherein all of the optical proxies included in the field of view of the imaging device have a uniform actual size.

17. The method of claim 10, wherein all of the optical proxies included in the field of view of the imaging device have a plurality of actual sizes such that the area of optical proxies is correlated to a distance of the optical proxies from the at least one observation point.

18. The method of claim 1, wherein step (d) comprises determining a vector of redirected sunlight, computing an articulation compensation that causes the redirected sunlight vector to impinge the target, and applying at step (e) the compensation to actuate the light redirecting element.

19. A heliostat system that redirects sunlight onto a centralized remote target, said system comprising a heliostat, the heliostat system comprising:
a) a light redirecting element articulable about two degrees of rotational freedom that redirects incident sunlight as a redirected light beam;
b) an optical proxy functional over a continuous range of angles in the two degrees of rotational freedom on the light redirecting element that optically modifies and broadcasts a portion of the sunlight incident on the heliostat as optical proxy light that encodes optical information of the redirected light beam in a modified property of the optical proxy light that is indicative of, and that is used to effect an actuation of, the light redirecting element and the aim of the redirected light beam;
c) an imaging device at an observation point proximal to the centralized remote target that observes the optical information of the optically modified and broadcast optical proxy light; and
d) a control system configured to use the optical information to determine the aim of the light redirecting element and that controllably actuates the light redirecting element with respect to the two degrees of rotational freedom in a manner that aims the redirected light beam onto the centralized remote target.

20. The heliostat system of claim 19, wherein the heliostat system comprises a plurality of heliostats, wherein the imaging device observes optical information from the modified and broadcast optical proxy light of the heliostats, and wherein the control system is configured to use the observed optical information to aim a redirected light beam of each heliostat onto the centralized remote target.

21. A system for aiming sunlight onto a centralized remote target, comprising:
a) a plurality of heliostats, each heliostat comprising:
i. a light redirecting element articulable about two degrees of rotational freedom that redirects incident sunlight as a redirected light beam;
ii. an optical proxy functional over a continuous range of angles in the two degrees of rotational freedom that optically modifies and broadcasts a portion of the incident sunlight as optical proxy light that encodes optical information of the redirected light beam in a modified property of the optical proxy light such that a two-dimensional area is illuminated by the optically modified, broadcast optical proxy light, wherein said optical information is indicative of, and is used to effect an actuation of, the light redirecting element and the aim of the redirected light beam;
b) a device that observes the optical information of the optically modified and distributed optical proxy light from at least one observation point proximal to the centralized remote target; and
c) a control system configured to use the observed optical information of the optical proxy light to determine a compensation that actuates each light redirecting element with respect to the two degrees of rotational freedom to aim each corresponding redirected light beam at the centralized remote target.

* * * * *